US012577785B2

(12) United States Patent
    Cociuban

(10) Patent No.: US 12,577,785 B2
(45) Date of Patent: Mar. 17, 2026

(54) ASCENDING MECHANISED ACCESS RAMP (A-MAR)

(71) Applicant: THE TRUSTEE FOR ROFRAUS TRUST, Maroubra (AU)

(72) Inventor: Mircea Eugen Virgil Cociuban, Maroubra (AU)

(73) Assignee: THE TRUSTEE FOR ROFRAUS TRUST, Maroubra (AU)

( * ) Notice: Subject to any disclaimer, the term of this patent is extended or adjusted under 35 U.S.C. 154(b) by 995 days.

(21) Appl. No.: 17/764,227

(22) PCT Filed: Sep. 28, 2020

(86) PCT No.: PCT/AU2020/051034
    § 371 (c)(1),
    (2) Date: Mar. 28, 2022

(87) PCT Pub. No.: WO2021/056081
    PCT Pub. Date: Apr. 1, 2021

(65) Prior Publication Data
    US 2022/0412097 A1    Dec. 29, 2022

(30) Foreign Application Priority Data

Sep. 26, 2019   (AU) ................................. 2019236731

(51) Int. Cl.
    *E04F 11/00*        (2006.01)
    *A61G 3/06*         (2006.01)
                        (Continued)
(52) U.S. Cl.
    CPC ............ *E04F 11/002* (2013.01); *A61G 3/061* (2013.01); *B61B 1/02* (2013.01); *B65G 69/2829* (2013.01);
                        (Continued)

(58) Field of Classification Search
    CPC .. E04F 11/002; E04F 2011/005; A61G 3/061; B65G 69/28; B65G 69/2829; B65G 69/30; B61B 1/02
    See application file for complete search history.

(56) References Cited

U.S. PATENT DOCUMENTS 2,370,427 A * 2/1945 Sherry ................... B60P 1/431
                                                   414/537
5,444,885 A    8/1995 Hanrahan et al.
                    (Continued)

FOREIGN PATENT DOCUMENTS

DE        201 14 943 U1     7/2002
EP            0236600 A1 *  9/1987
                    (Continued)

OTHER PUBLICATIONS

International Search Report dated Nov. 23, 2020 from International Patent Application No. PCT/SU2020/051034, 4 pages.
                    (Continued)

*Primary Examiner* — Gary S Hartmann
(74) *Attorney, Agent, or Firm* — Ruggiero McAllister & McMahon LLC

(57)        ABSTRACT

There is an access ramp system for access between a first and a second object. The second object is elevated with respect to the first object. The system includes a supporting frame mountable to the first object; a casing box mounted to the supporting frame; a sliding ramp installed to slide inside the casing box; and a deployment mechanism for automatically moving the sliding ramp between a stand-by and a fully deployed position. In the deployed position, a nose of the sliding ramp is raised to a height equal with the second object and is engaged with the second object. In the deployed position, the sliding ramp and casing box extend across a vertical gap and a horizontal gap between the first and second objects. An upper surface of the sliding ramp and (Continued)

casing box defines a support surface for supporting people or objects moving between the first and second objects.

18 Claims, 19 Drawing Sheets

(51) Int. Cl.
   B61B 1/02 (2006.01)
   B65G 69/28 (2006.01)
   B65G 69/30 (2006.01)

(52) U.S. Cl.
   CPC ..... *B65G 69/2852* (2013.01); *B65G 69/2864* (2013.01); *B65G 69/2876* (2013.01); *B65G 69/30* (2013.01); *E04F 2011/005* (2013.01)

(56) References Cited

U.S. PATENT DOCUMENTS

| | | | |
|---|---|---|---|
| 5,457,838 | A | 10/1995 | Gelder et al. |
| 5,845,579 | A | 12/1998 | Langley et al. |
| 6,419,050 | B1 | 7/2002 | Sardonico |
| 2001/0042489 | A1 | 11/2001 | Yamaguchi et al. |
| 2010/0043664 | A1 | 2/2010 | Winkelmann |

FOREIGN PATENT DOCUMENTS

| | | | | |
|---|---|---|---|---|
| ES | 2372372 | T3 * | 1/2012 | ............. A61G 3/061 |
| WO | 1999/031324 | A1 | 6/1999 | |
| WO | WO-0020252 | A1 * | 4/2000 | ............. A61G 3/061 |
| WO | WO-0121434 | A2 * | 3/2001 | ............. A61G 3/061 |
| WO | 2008/040138 | A1 | 4/2008 | |

OTHER PUBLICATIONS

Written Opinion dated Nov. 23, 2020 from International Patent Application No. PCT/SU2020/051034, 7 pages.
Australian Disability Standards for Accessible Public Transport 2002, pp. 1-80.

\* cited by examiner

REPLACEMENT SHEET

GENERAL VIEW
NOT TO SCALE

PLAN VIEW

ASCENDING MECHANISED ACCESS RAMP (A-MAR)

CROSS REFERENCE TO RELATED APPLICATION

This application is a national stage entry of International Application No. PCT/AU2020/051034 filed on Sep. 28, 2020, which claims priority from Australian Application No. 2019236731 filed on Sep. 26, 2019, each of which is incorporated herein by reference in its entirety.

BACKGROUND OF THE DISCLOSURE

1. Field of the Disclosure

The present application relates to access ramps and in particular to an A-MAR for facilitating access to elevated or displaced positions for disabled or less mobile persons Specific embodiments of the disclosure are directed to a remote controlled A-MAR, designed to be used by disabled persons on wheelchairs, in order to provide independent access to public transport (e.g. trains, tramways and buses). However, it will be appreciated that the disclosure can be also used by aged population, persons with reduced mobility, persons with prams and heavy luggage, as well as by general public to assist with accessing shopping centres, public buildings, private properties and any other edifices.

2. Description of the Related Art

Significant efforts are actually made around the world to provide an independent access for disabled persons on wheelchairs to the public transport and generally to the "day by day" facilities.

On the train stations, the gap between the edge of the platform and the train floor is measured as a sum of the horizontal gap and vertical gap. An acceptable stepping distance parameter is 200 mm, while 300 mm is considered unacceptable.

In the US, the Accessibility Guidelines for Buildings and Facilities suggests a vertical gap less than 16 mm and a horizontal gap less than 76 mm.

In Europe, the Rail Vehicle Accessibility Regulations 2010 stipulates a vertical gap less than 50 mm and a horizontal gap less than 75 mm, in order to provide a wheelchair independent access to the trains.

In Australia, in order to provide an independent access for disabled passengers to the trains, the Disability Standards for Accessible Public Transport 202 recommends a vertical gap below 15 mm and a horizontal gap below 40 mm, in accordance with AS3856.1-198.

On some train stations, permanent fixed or mechanised devices are installed to improve the access to the trains.

U.S. Pat. No. 5,444,885 A of Hanrahan, P J, Keegan, E K & Goffe, AT 195 ("Platform edge warning ramp"), discloses the use of an inclined ramp, which can be lowered or raised by an adjustable bolt, in order to reduce to a certain extent the vertical and horizontal gap between the platform and the train. However, the ramp adjustment can delay trains with different floor heights and widths of tread plates.

US Patent Application Publication 20010/042489 A1 of Yamaguchi, H, Maruyama, A, Takahashi, T & Mizobuchi, T 2001 ("Step apparatus for platform"), discloses a horizontal step installed on the station platform and operated by a rotary shaft and rotary mechanism, also guided by sensors to detect the train position. This device can cover the horizontal gap, including for curved platforms, however, cannot cover the vertical gap.

PCT Patent Application Publication WO 2008/040138 A1 of Winkelmann, U & Hug, R 2010 ("Gap-bridging device for train platforms"), discloses a gap-bridging plate installed on the station platform and actioned by a motor. This device can cover the horizontal gap between the station platform and the train, but not the vertical gap.

On train stations where an independent access for disabled persons on wheelchair cannot be provided and a permanent access ramp cannot be installed, the A-MAR proposed by the present Applicant becomes a reliable and affordable option to consider.

A reference herein to a patent document or any other matter identified as prior art, is not to be taken as an admission that the document or other matter was known or that the information it contains was part of the common general knowledge as at the priority date of any of the claims.

SUMMARY OF THE DISCLOSURE

According to an aspect of the present disclosure, there is provided an ascending mechanised access ramp system for providing independent access between a station platform and a floor of a train, the system including:

a supporting frame mountable to the platform;

a substantially planar casing box hingedly mounted to the supporting frame;

a substantial planar sliding ramp, installed inside the casing box;

side wheels installed on the sides of the sliding ramp, to allow the sliding ramp to skate inside the casing box;

a remote controlled deployment mechanism configured to automatically move the sliding ramp between a stand-by position and a fully deployed position, such that a nose of the sliding ramp is raised to a height equal with the train floor and is engaged with the train floor;

one or more sensors installed on the train floor and one or more sensors installed on the nose of the sliding ramp to control the deployment of the sliding ramp; and wherein, in the deployed position, the sliding ramp extends across both a vertical gap and a horizontal gap between a station platform and the floor of the train.

In some embodiments, the supporting frame is bolted directly to a surface of the platform.

In some embodiments, the casing box is attached to the supporting frame by a hinge.

In some embodiments, the nose of the sliding ramp includes one or more sensors for detecting one or more sensors on the train floor, in order to control the deployment of the sliding ramp.

In some embodiments the system includes a protection wall disposed on one or each side of the ascending mechanised access ramp. In some embodiments, the or each protection wall includes at least two safety bollards. Preferably at least one of the safety bollards has a warning button configured to trigger one or more flashing lights to signal a train driver that use the sliding ramp is requested.

In some embodiments, the system includes a handrail attached on each side of the casing box.

In some embodiments, the casing box is bascule type and is moveable by a casing box actuator.

In some embodiments, the actuator is installed underneath the casing box.

In some embodiments, the actuator is installed inside the protection wall.

In some embodiments, the sliding ramp is made of electrical non-conductive material.

In some embodiments, the deployment mechanism includes an actuator for enabling the sliding ramp to slide inside the casing box. In some embodiments, the deployment mechanism includes a telescopic screw for enabling the sliding ramp to slide inside the casing box. In some embodiments, the deployment mechanism includes a ball screw for enabling the sliding ramp to slide inside the casing box. In some embodiments, the deployment mechanism includes a rack and pinion steering for enabling the sliding ramp to slide inside the casing box.

In some embodiments, the supporting frame is rotatably supported on wheels and can be manually moved along the platform and positioned in front of a train door.

In some embodiments, the supporting frame can automatically move along the platform to enable the precise positioning of the system in front of a train door.

In some embodiments, the deployment mechanism includes a casing box actuator to rotatably angle the casing box such that the nose of the sliding ramp is equal to or higher than the floor of the train.

In some embodiments, the deployment mechanism is configured to move the sliding ramp between the stand-by position and the fully deployed position in two stages. Preferably, in a first stage of deployment, the deployment mechanism rotatably angles the casing box to an elevated angle. Preferably, in a second stage of deployment, the deployment mechanism slidingly moves the sliding ramp within the casing box to bring the nose of the sliding ramp into contact with the train floor.

In accordance with a second aspect of the present disclosure, there is provided an ascending mechanised access ramp system for providing access between a first object and a second object, wherein the second object is elevated with respect to the first object, the system including:

a supporting frame mountable to the first object;
 a substantially planar casing box hingedly mounted to the supporting frame;
 a substantial planar sliding ramp, installed inside the casing box and configured to slide within the casing box; and
 a remote controlled deployment mechanism configured to automatically slidingly move the sliding ramp between a stand-by position and a fully deployed position, such that a nose of the sliding ramp is raised to a height equal with the second object and is engaged with the second object;
 wherein, in the deployed position, the sliding ramp and casing box extend across a vertical gap between the first and second objects and wherein an upper surface of the sliding ramp and casing box defines a support surface for supporting people or objects moving between the first and second objects.

In some embodiments, the second object is horizontally separated from the first object across a horizontal gap and wherein, in the deployed position, the sliding ramp and casing box extend across the horizontal gap and the vertical gap.

In some embodiments, the system includes one or more sensors installed on the second object and one or more sensors installed on the nose of the sliding ramp to control the deployment of the sliding ramp based on proximity between the second object and the nose of the sliding ramp.

In some embodiments, the system includes a protection wall disposed on one or each side of the ascending mechanised access ramp.

In some embodiments, the deployment mechanism is configured to move the sliding ramp between the stand-by position and the fully deployed position in two stages. Preferably, in a first stage of deployment, the deployment mechanism rotatably angles the casing box to an elevated angle. Preferably, in a second stage of deployment, the deployment mechanism slidingly moves the sliding ramp within the casing box to bring the nose of the sliding ramp into contact with the second object.

The A-MAR is a remote controlled equipment designed to provide an easy, safe and independent access for disabled persons on wheelchairs and passengers with reduced mobility from the station platform to the train floor, as well as from the train floor to the station platform.

BRIEF DESCRIPTION OF THE FIGURES

Example embodiments of the disclosure will now be described, by way of example only, with reference to the accompanying drawings in which.

The drawings illustrate the concept design of a remote controlled A-MAR, which can provide independent access for disabled persons on wheelchair from the station plat-forms up to the train floors.

The drawings illustrate different deployment stages of the A-MAR, from the "stand-by" (not in use) position to "fully deployed" position, when is ready to be used by passengers.

DETAILED DESCRIPTION OF THE DISCLOSURE

Embodiments of the disclosure will be described herein as an ascending mechanised access ramp (A-MAR) system to be installed on train stations to provide independent access to trains for disabled persons on wheelchairs. In this appli-cation, the A-MAR provides access between the train plat-form and the train floor. In particular, the disclosure is advantageous where a large horizontal and/or vertical gap exists between the platform and a train floor, which may be greater than safety regulations.

Figure 1:
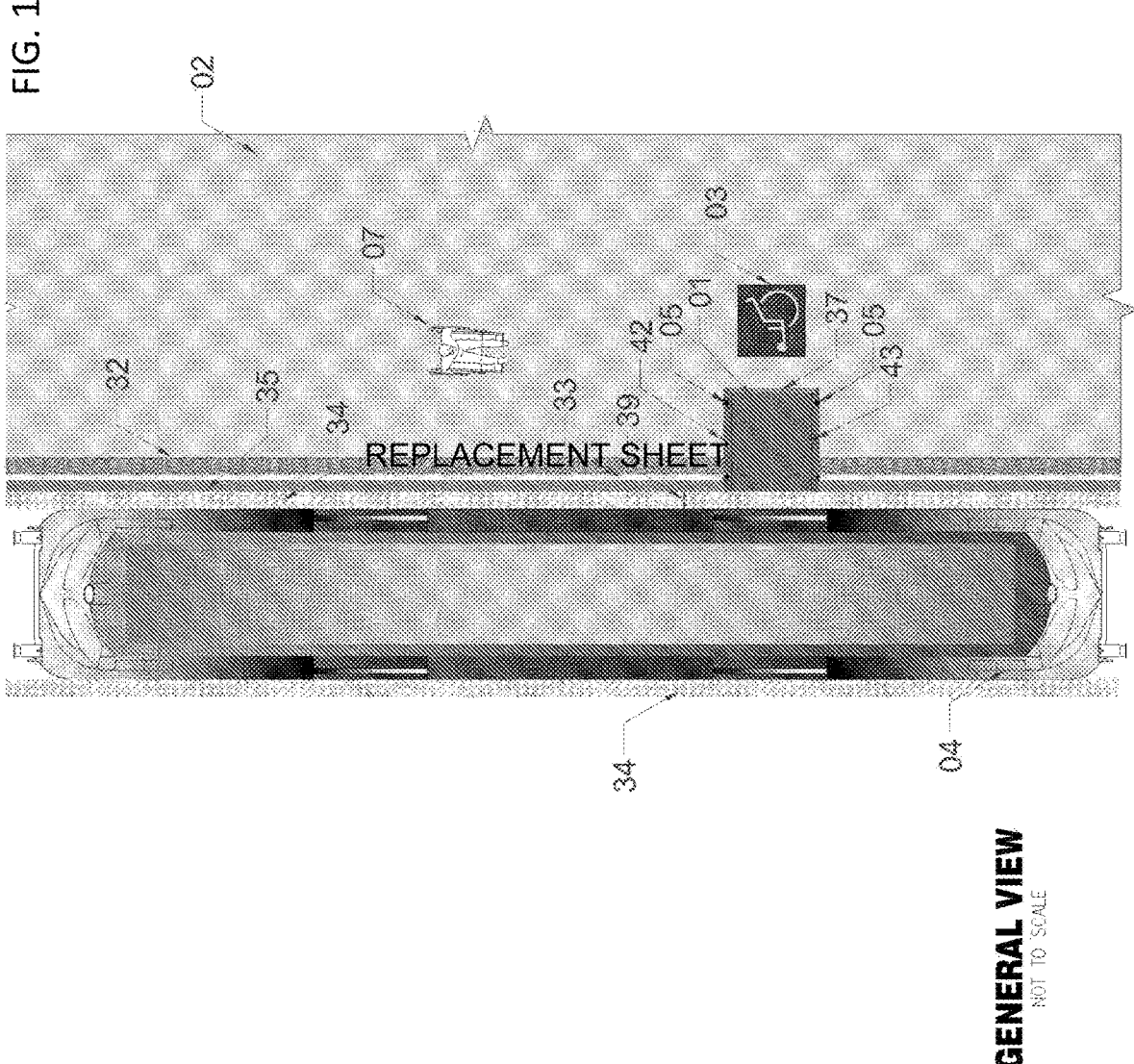
FIG. 1 is a plan view of a train station platform, illustrating a disabled person on a wheelchair approaching a boarding assistance area, which is equipped with an A-MAR.

However, it will be appreciated that the disclosure can also be used in other applications such as assisting with accessing shopping centres, public buildings, private prop-erties and any other edifices and by other users such as the aged population, persons with reduced mobility, persons with prams and heavy luggage, as well as by general public. The disclosure may also be used to facilitate the loading and unloading of general merchandise to and from cars, trucks, trains or buildings. As such, more generally, the A-MAR is capable of providing access between two objects being displaced horizontally and/or vertically.
System Overview With reference to FIG. 1, there is illustrated a plan view of a part of a train station, with a passenger train 4 stopped at a platform 2. The platform 2 has provisions for a boarding assistance area 3, which is equipped with an ascending mechanised access ramp (A-MAR) 11 as described below. The boarding assistance area typically includes signs indi-cating a location where people needing assistance can safely board the train 4.

A disabled person on wheelchair 7 is illustrated on platform 2 approaching the boarding assistance area 3, with the intention to embark the train 4.

As best illustrated in FIGS. 3 to 7, access of the disabled person on wheelchair 7 to the A-March 1 is facilitated by a small ramp 37 that is mounted to or integral with the platform 2. Ramp 37 may be formed of any solid material such as metal, concrete or plastics materials.

Figure 7:
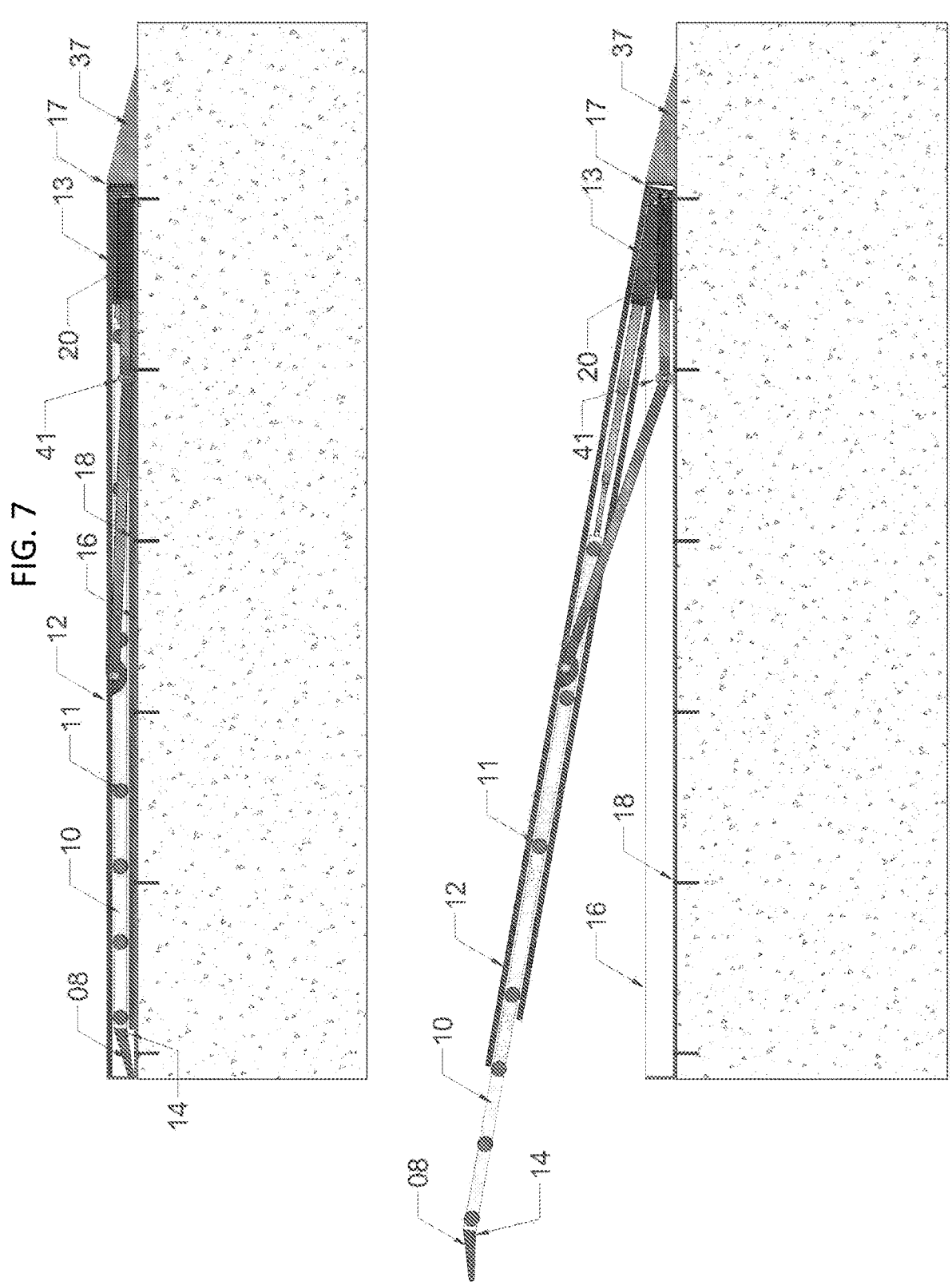
FIG. 7 illustrates detailed side views of the A-MAR in a stand-by position (upper panel) and a fully deployed position (lower panel)
Figure 8:
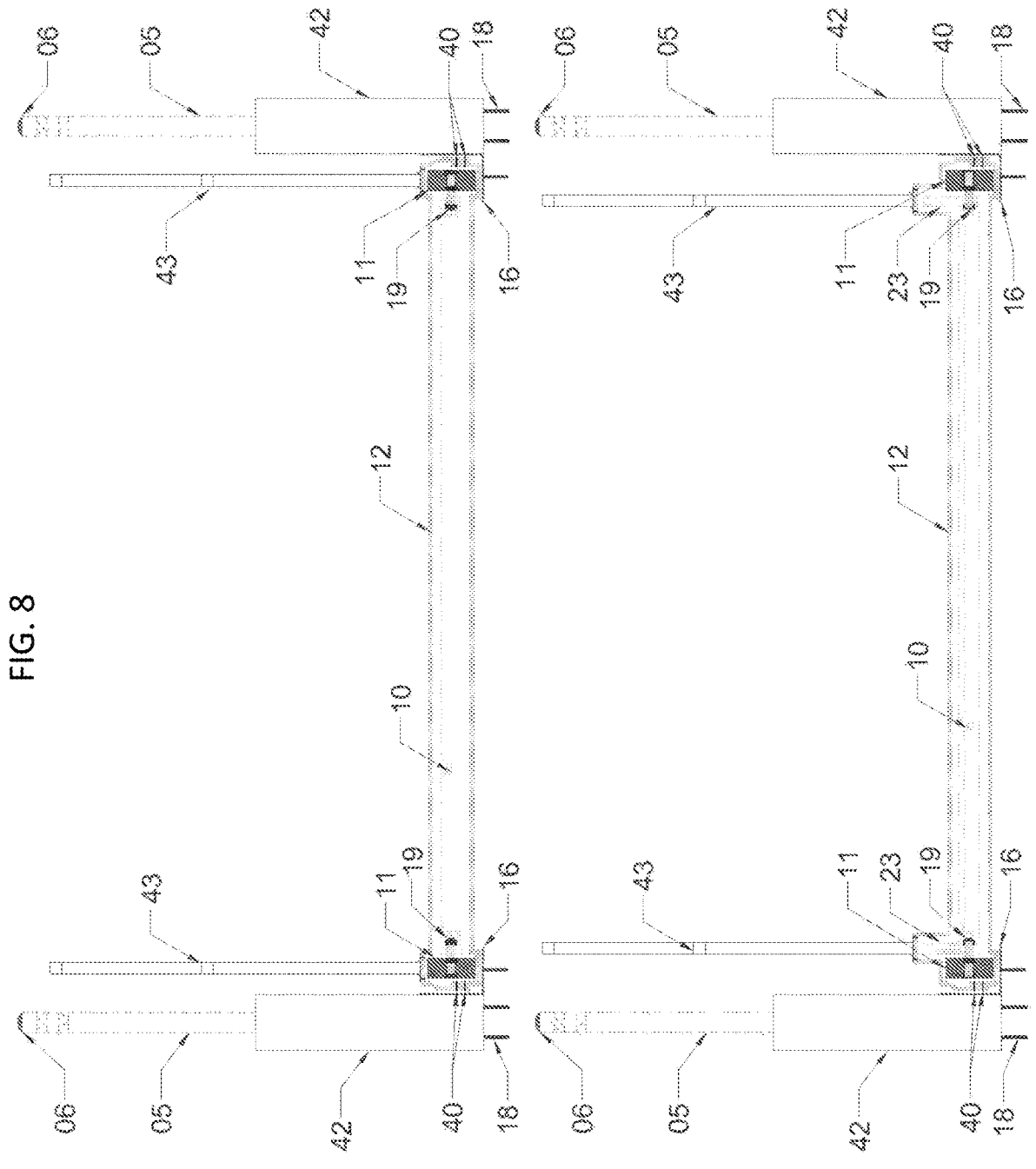
FIG. 8 illustrates cross sections of two embodiments of the sliding ramp of the A-MAR, in the embodiment illustrated in the lower panel, the sliding ramp includes a safety edge while in the embodiment illustrated in the upper panel, the sliding ramp does not include a safety edge.

Referring to FIGS. 7 and 8, the A-March 1 includes a supporting frame 16 mountable to the platform 2. A sub-stantially planar casing box 12 is hingedly mounted to the supporting frame 16 at or adjacent an edge 35 of the platform 2. The casing box 12 includes a substantially planar upper surface that is configured to lay parallel to but above the train platform 2 when the A-March 1 is in a stand-by configuration shown in the upper panel of FIG. 7. The casing box 12 also includes substantially vertical side walls extend-ing down from edges of the upper surface to the surface of the platform 2. In other embodiments, support frame 16 and casing box 12 may be embedded within a recess in the platform 2 such that a top surface of the casing box 12 is flush with the platform 2. In these embodiments, ramp 37 may not be needed.

The casing box 12 houses a substantially planar sliding ramp 10, which, in the stand-by configuration, lays flat inside the casing box parallel to the surface of the platform 2. Sliding ramp 10 is slideable within the casing box 12 such that it can extend outward from the casing box 12 to provide an extendible support surface. A plurality of side wheels 11 are rotatably mounted on both sides of the sliding ramp 10 and configured to rotate to allow the sliding ramp 10 to slide or skate inside the casing box 12.

As best shown in FIG. 7, a remote controlled deployment mechanism, including a ramp actuator 13 and casing box actuator 20, is configured to automatically move the A-March 1 between the stand-by position and a fully deployed position, such that a nose 8 of the sliding ramp 10 is raised to a height equal with the train floor 9 and is engaged with the train floor 9. In the deployed position, the sliding ramp 10 extends across both a vertical gap and a horizontal gap between the station platform (or, more gen-erally, a first object) and the train floor 9 (or, more generally, a second object).

The A-March 1 also includes one or more sensors 15 installed on the train floor 9 and one or more sensors 14 installed on the nose 8 or another part of the sliding ramp 10. These sensors 14 and 15 communicate wirelessly to sense the position of the nose 8 of sliding ramp 10 relative to the train floor 9 and send sensor signals to a central control unit to control the deployment of the sliding ramp 10. This sensor communication may involve a proximity sensing to deter-mine when the nose 8 of the sliding ramp 10 is at the correct height and also when the nose 8 is sitting on the train floor 9. In some embodiments, sensors 14 and 15 communicate wirelessly via the Bluetooth wireless protocol. In other embodiments, sensors 14 and 15 communicate wirelessly via other wireless communication protocols.

Figure 2:
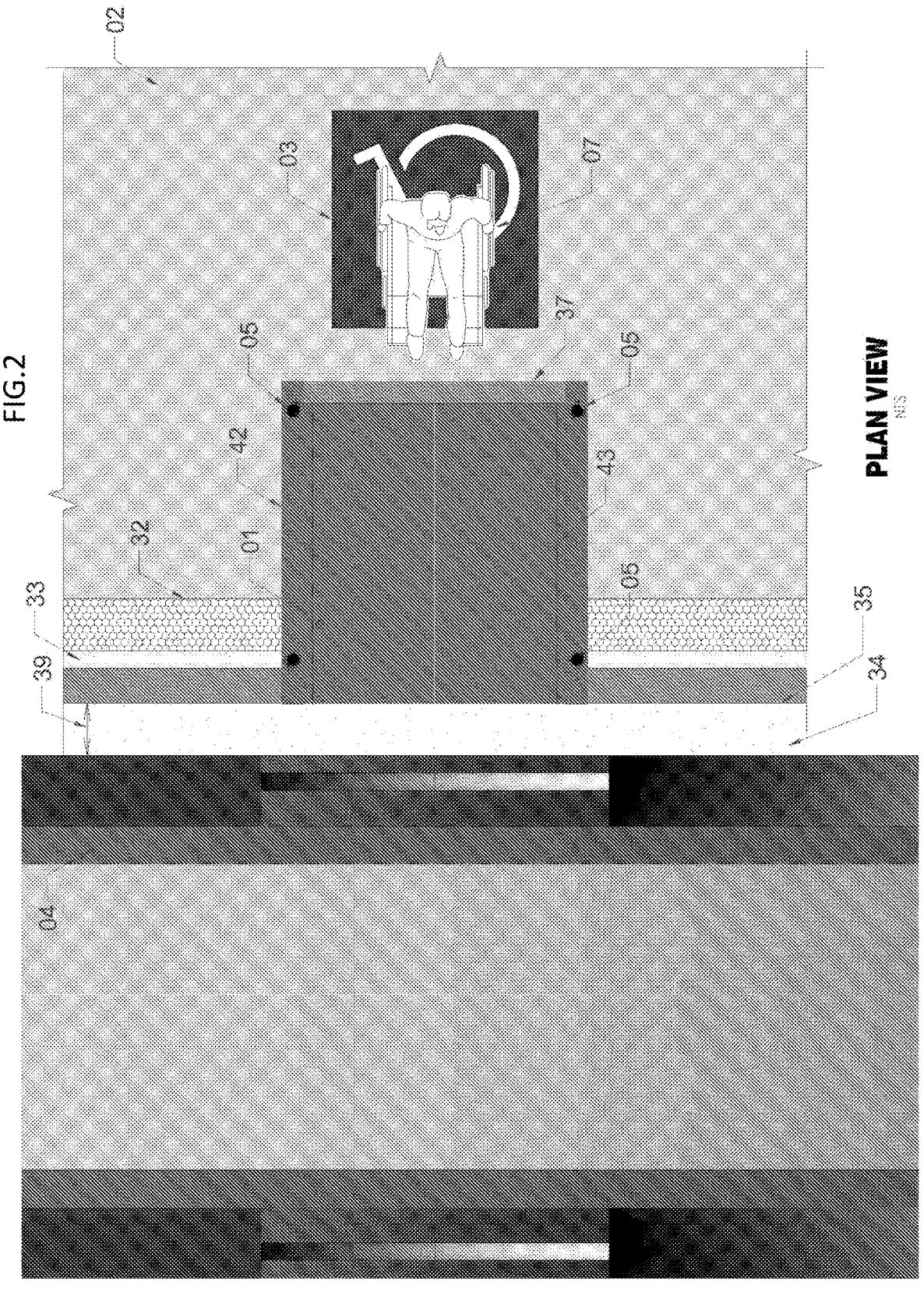
FIG. 2 is a plan view of the platform of the train station, illustrating a disabled person on a wheelchair waiting on a boarding assistance area to use the A-MAR to embark a train.

As shown best in FIGS. 2 and 8, a protection wall 42 may be disposed on each side of the A-March 1.

With reference to FIG. 2, there is illustrated a plan view of the platform 2, which more clearly shows the boarding assistance area 3 equipped with an A-March 1. The protec-tion wall 42 is bolted or otherwise attached to the platform 2 on each side of the A-March 1. The protection wall 42 provides enhanced protection to the commuters while using the A-March 1.

A plurality (e.g. four) safety bollards 5 may be installed on the protection walls 42 to identify the A-March 1 and, at the same time, assist in operating the A-March 1.

Referring still to FIG. 2, the disabled person in wheelchair 7 is positioned on the boarding assistance area 3, ready to use the A-March 1, with the intention to access the train floor 9.

Figure 3:
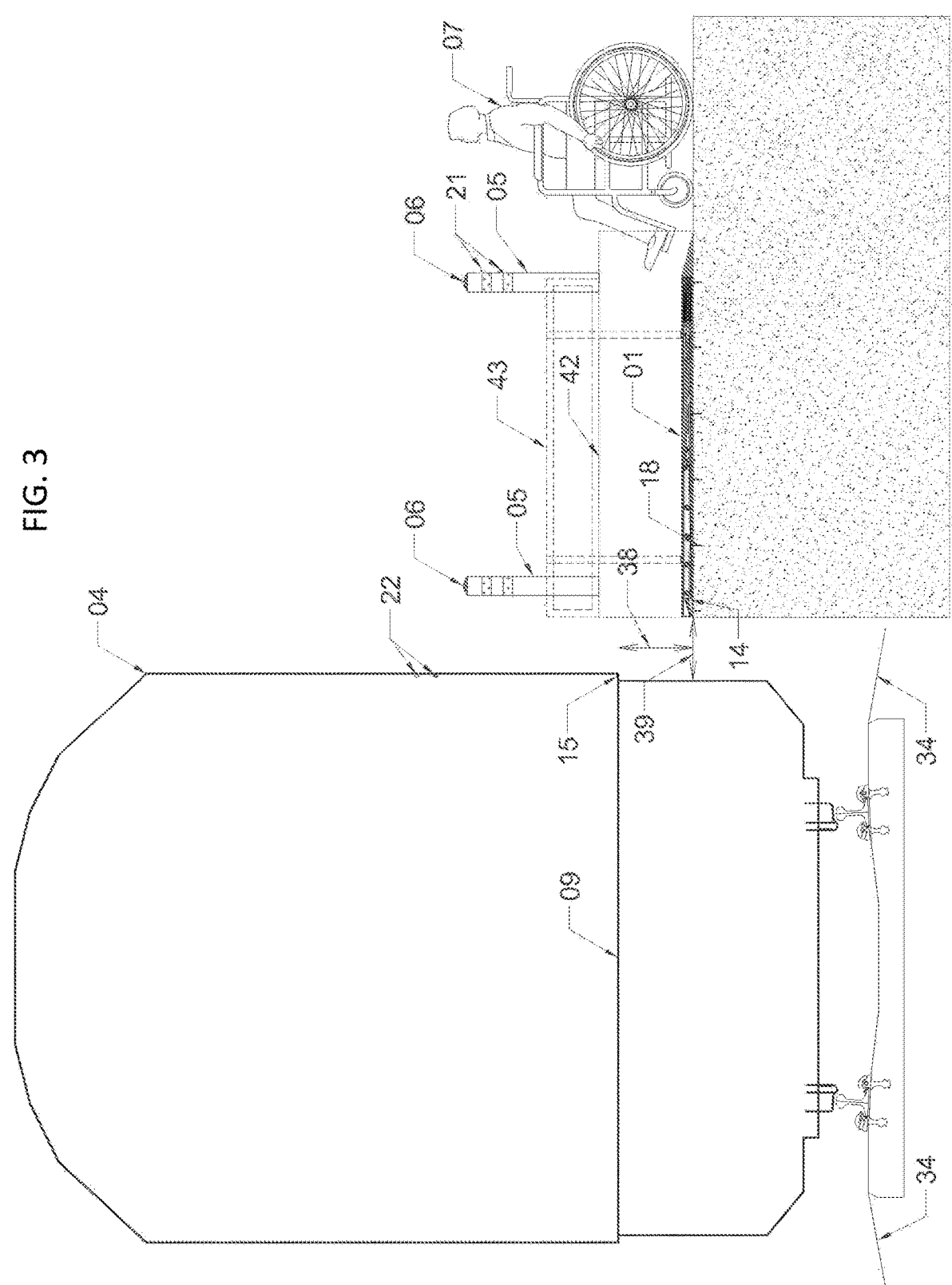
FIG. 3 is a side view of a train platform and train illustrating the A-MAR in a "stand-by" position in which the ramp is not deployed.

Referring now to FIG. 3, in the stand-by position, the casing box 12 and sliding ramp 10 are positioned flat on the platform. The safety bollards 5 may be equipped with one or more warning buttons 21, which, when pressed by the person seeking to use the A-March 1 or another person, will trigger respective flashing lights 6 and signal the train driver the request to use the A-March 1. When a train approaches and sensors 14 and 15 come into proximity and the A-March 1 deployment can be activated by the central control unit. Similar warning buttons may be located on the train for when a person wishes to use the A-March 1 to alight from the train.

Figure 4:
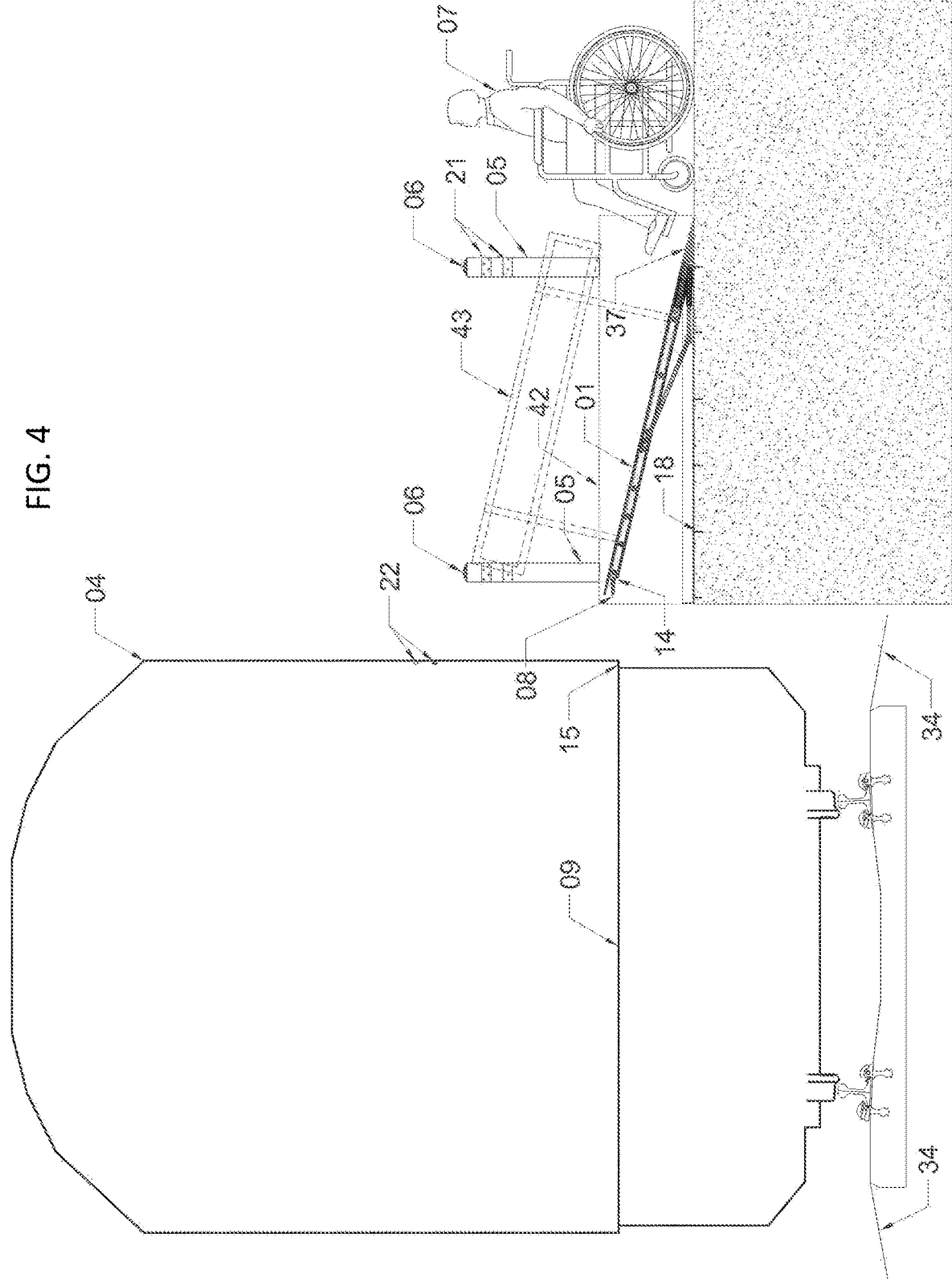
FIG. 4 is a side view of a train platform and train illustrating the A-MAR partially deployed, with a nose of the sliding ramp raised to a height of the train floor.

In some embodiments, the deployment of sliding ramp 10 occurs in a two stage process with an intermediate position occurring between the two stages. FIG. 4 illustrates a side view of the A-March 1 when it is in such an intermediate deployed position. In the first stage, the casing box 12 and enclosed sliding ramp 10 is preferably first raised vertically by a casing box actuator 20 to an elevated position. In some embodiments, this elevated position is such that the nose 8 of the sliding ramp 10 is at the same height as the train floor 9. In other embodiments, the elevated position may be such that the nose 8 is somewhat lower than the height of the train floor and the remainder of the height difference is covered by extension of the sliding ramp (described below). This elevation of the casing box 12 occurs by actuator 20 rotating casing box 12 and ramp 10 about a hinge 17 in a bascule type arrangement. Here, actuator 20 may include a pneumatic, hydraulic or electrical actuator having an actuator arm connected to an underside of casing box 12 to provide lift. In this intermediate position of the ramp deployment, the A-March 1 covers the vertical gap 38 between the edge of the platform 35 and the train floor 9 but does not yet cover a horizontal gap 39. This deployment process is controlled by the central control unit controlling actuator 13 in response to sensor signals received by sensors 14 and 15.

After the vertical lift of the first stage of deployment, horizontal actuation may occur to cover the horizontal gap 39 between the platform 2 and train floor 9. In this stage of deployment, the sliding ramp 10 slides laterally within the casing box 12 under actuation by actuator 13 and rotation of side wheels 11, which engage an interior surface of casing box 12. In some embodiments, actuators 20 and 13 are one and the same, and perform both the lifting of the casing box 12 and the extension of the sliding ramp 10. In one embodiment, the actuator arm of actuator 20 is mounted to a side of sliding ramp 10 and includes a scissor joint to provide horizontal sliding motion to the sliding ramp 10 in addition to the vertical lift of casing box 10 during the first state of deployment. In other embodiments, actuator 13 is separate to actuator 20 and includes a linear actuator such as a screw actuator or rack and pinion actuator to effect the lateral sliding motion of sliding ramp 10 within casing box 12.

Figure 5:
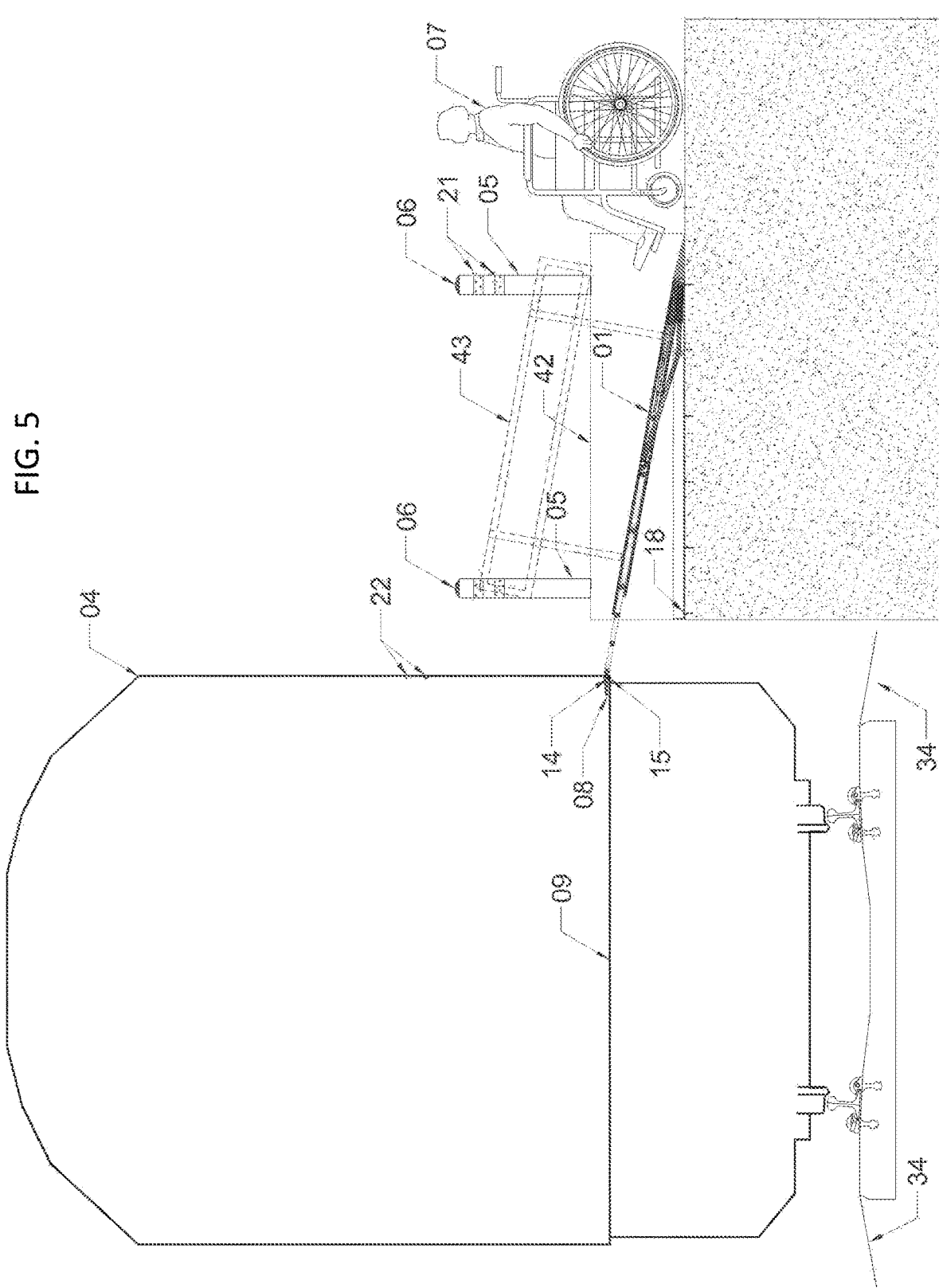
FIG. 5 is a side view of a train platform and train illustrating the A-MAR in a "fully deployed" position in which a nose of the ramp is sitting on the train floor and the ramp is ready to be used by the disabled person on a wheelchair and all other commuters.

Like the vertical lift, the lateral sliding extension of sliding ramp 10 is controlled by feedback from sensors 14 and 15 to the central control unit. When the sensors 14 and 15 sense the nose 8 of the sliding ramp 10 is sitting on the train floor 9, the second state of deployment is complete and the A-March 1 is positioned in a fully deployed position, as illustrated in FIG. 5. In the fully deployed position, the A-March 1 is fully covering both the vertical gap 38 and the horizontal gap 39 between the platform 2 and the train floor 9.

In some embodiments, the first and second stages of deployment occur in conjunction with each other such that the casing box 12 is lifted vertically at the same time as the sliding ramp 10 is laterally extended from the casing box 12.

Figure 6:
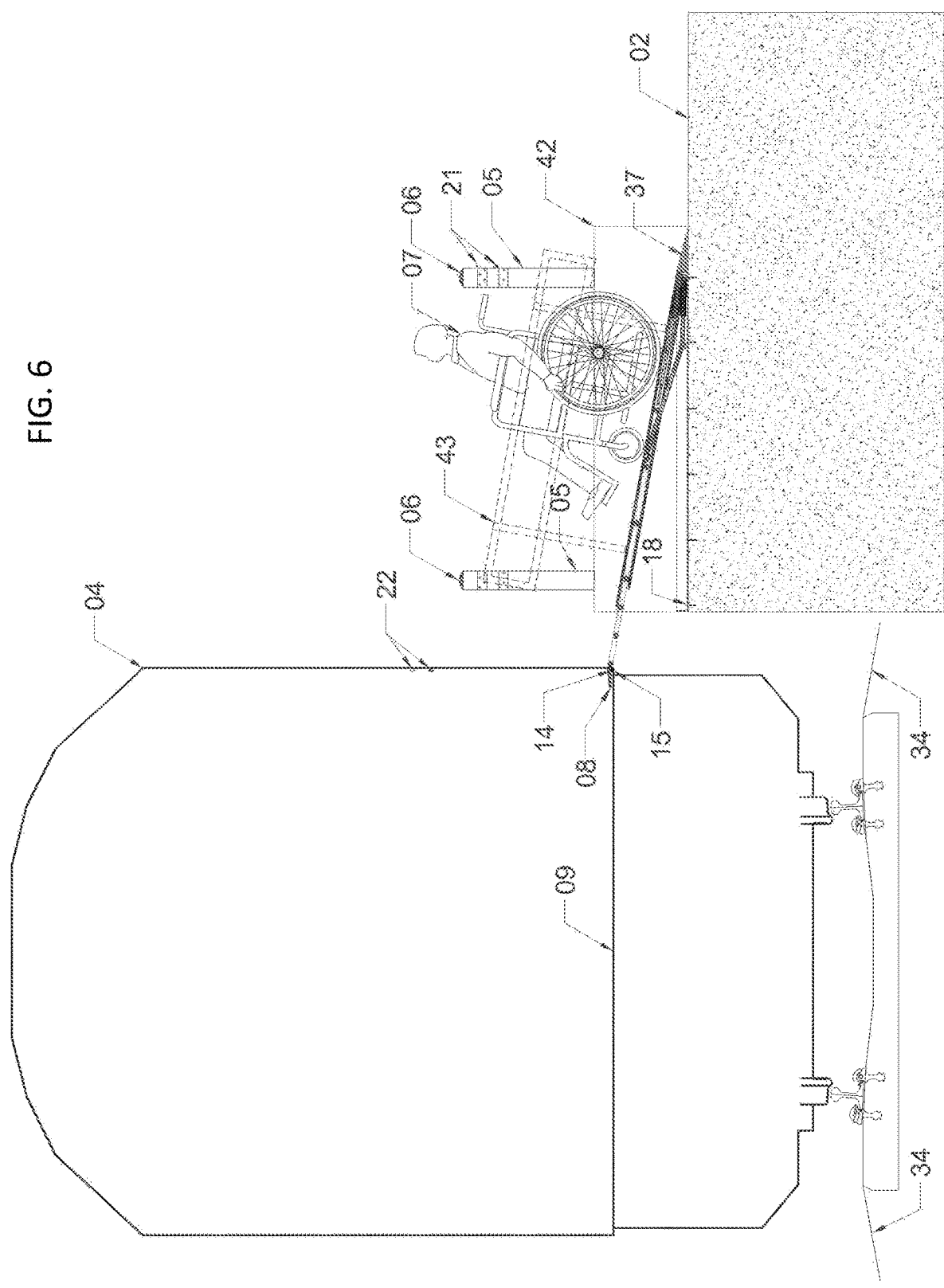
FIG. 6 is a side view of a train platform and train illustrating a disabled person on a wheelchair using the fully deployed A-MAR to access to the train floor.

In the fully deployed position, illustrated in FIGS. 5, 6 and the lower panel of FIG. 7, the A-March 1 is ready to be used by a disabled person on wheelchair 7 to reach the train floor 9 from the platform 2. The A-March 1 is also ready to be used by a disabled person on wheelchair 7 to reach the platform 2 from the train floor 9. In some embodiments, the deployment process takes about 5 seconds to complete. As illustrated, in the fully deployed position, an upper surface of the casing box 12 and an upper surface of the sliding ramp 10 form a supporting surface to provide access for a person to pass between the platform 2 (or, more generally, a first object) and the train floor 9 (or, more generally, a second object).

FIG. 6 illustrates the fully deployed A-March 1 and a disabled person on wheelchair 7 using the A-MAR to access the train floor 9.

The sliding ramp 10 is preferably made from a composite material, to have a minimum weight and to provide the required structural strength to support the weight of people. Further, the sliding ramp 10 may be made from or include an electrical non-conductive material, in order to protect the commuters from a potential electrocution.

With reference to FIG. 8, it is illustrated cross sections of the A-March 1 with two options: with a safety edge 23 and without safety edge. To enhance the safety for commuters using the A-March 1, handrails 43 may be attached on each side of the casing box 12.

The A-March 1 is most of the time used by a single disabled person in wheelchair 7 at the time, either to embark to the train floor 9 or to disembark to the platform 2 of the train station.

Preferably the A-March 1 is built with heavy duty components which are robust so as to bear use by regular heavy pedestrian traffic. Heavy duty components makes reference to more robust sliding ramps, casing boxes, supporting frames and actuators.

Figure 19:
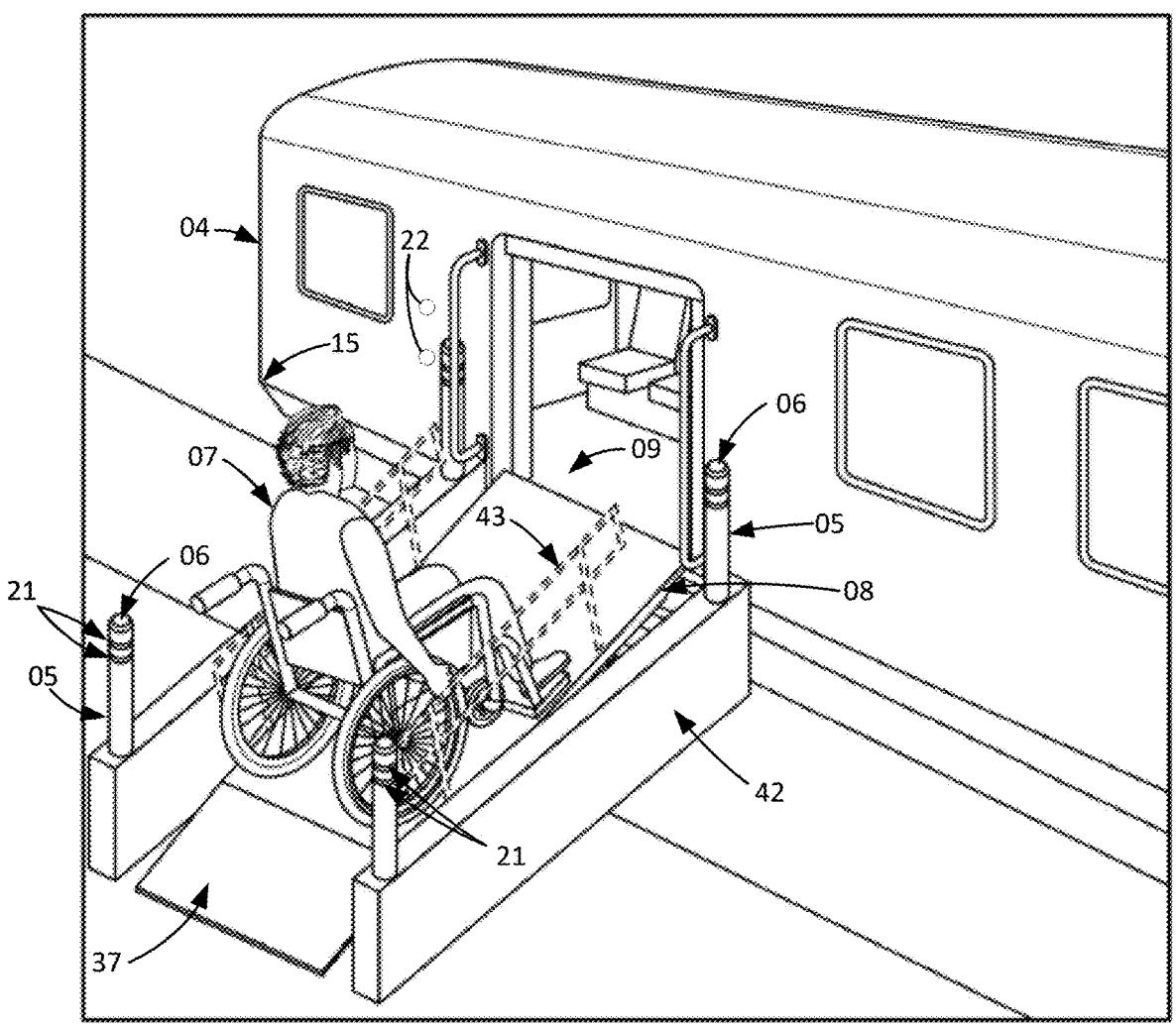
FIG. 19 is a perspective view of FIG. 4 exemplifying the A-MAR in a partially deployed position in accordance with an embodiment of the disclosure.

FIG. 19 shows an exemplary perspective view of the present disclosure in operation. In the view provided by FIG. 19, A-MAR is shown in its partially deployed position. The person in a wheelchair 07 is shown approaching a passenger train 4 which has come to a stop. After which A-MAR is activated through the use of one or more warning buttons 21 which may be activated by a user such as a person in a wheelchair 07. Once A-MAR is activated, the ramp rises from the platform, as described elsewhere, to a height where the sliding ramp is at least substantially aligned with the floor of the train 09 allowing for access into the train. Alignment occurs when the nose 08 of the sliding ramp is at substantially the same height as the floor of the train 09 and is achieved through the use of one or more sensors to aid in alignment, as described elsewhere. A-MAR includes safety bollards 5 which may include the one or more warning buttons 21. As discussed earlier, the one or more warning buttons 21 may be activated by the person in a wheelchair 07 when they wish to enter the train. Conversely, when the person in a wheelchair 07 wishes to embark from the train, warning buttons 22, which are typically installed inside the wall of the train, may be activated to alert the train driver (not shown) that the person in the wheelchair 07 wishes to embark from the train.

FIGS. 9-14 illustrate embodiments of the A-MAR that are built with heavy duty components.

The A-March 1, built with heavy duty components, is recommended also to be used for longer and wider ramps, to cover significant vertical gaps 38 and horizontal gaps 39 between the platform 2 and the train floor 9.

The A-March 1, built with heavy duty components, is as well recommended to be used for loading and unloading heavy merchandise from vehicles.

Figure 9:
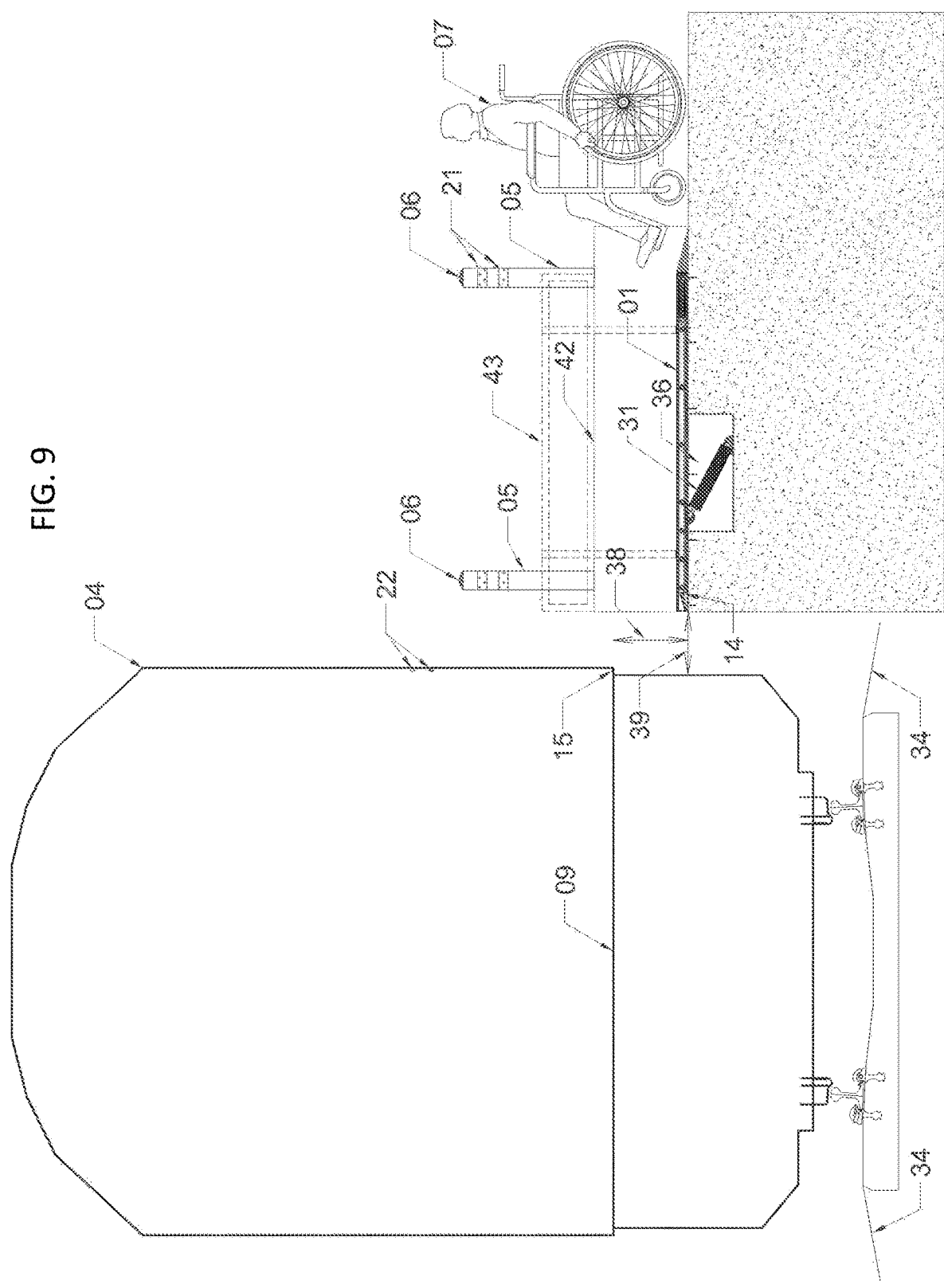
FIG. 9 is a side view of a train platform and train illustrating an A-MAR built with heavy duty components and showing the A-MAR in a stand-by position (ramp not in use)
Figure 10:
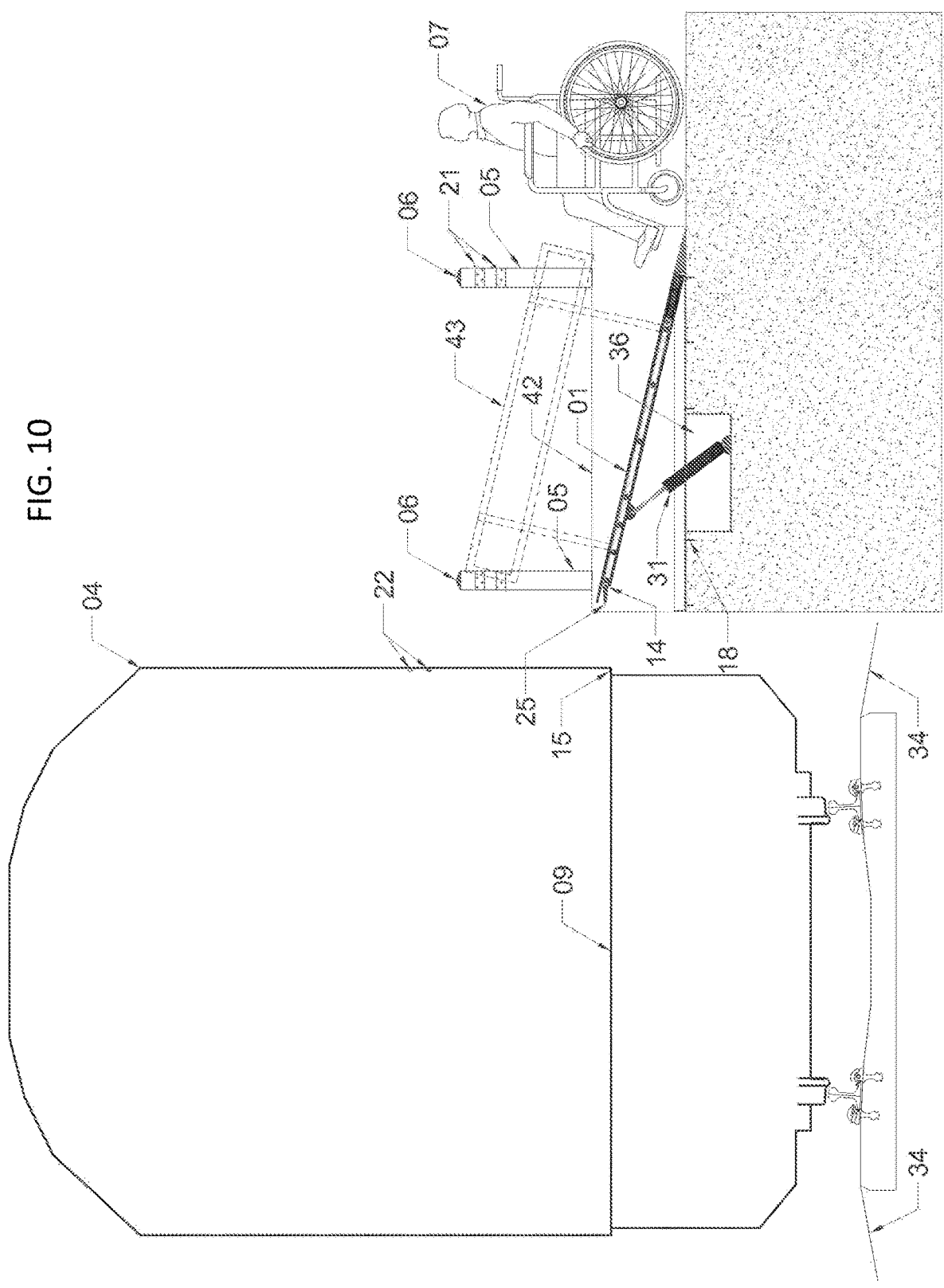
FIG. 10 is a side view of a train platform and train illustrating an A-MAR built with heavy duty components and showing a heavy duty sliding ramp partially deployed with the "nose" of the ramp raised to the height of the train floor.
Figure 11:
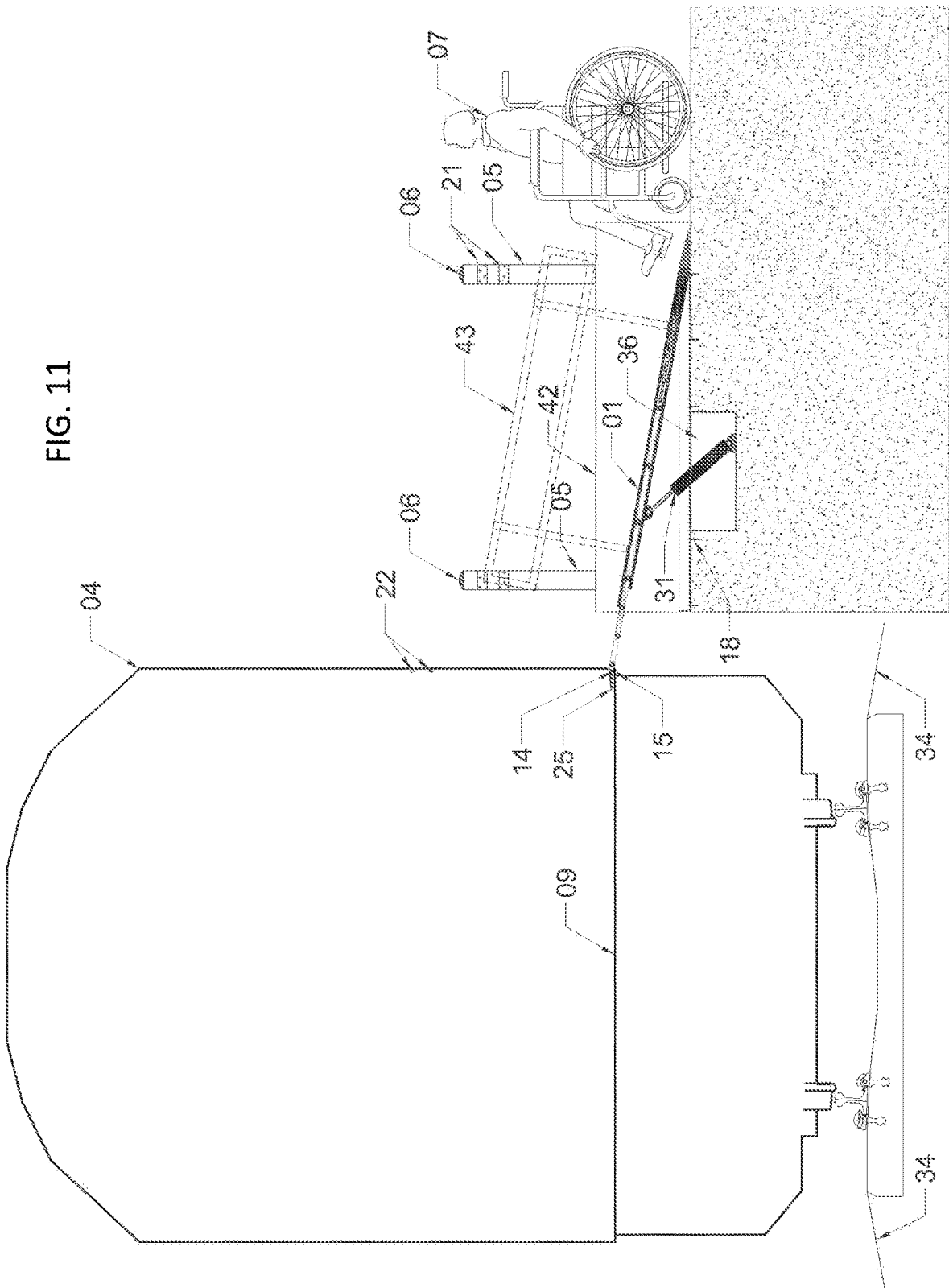
FIG. 11 is a side view of a train platform and train illustrating an A-MAR built with heavy duty components and showing a heavy duty sliding ramp fully deployed up to the train floor.

FIG. 9 illustrates a side view of an A-March 1, built with heavy duty components, in the stand-by position (when not in use). FIG. 10 illustrates the A-March 1, built with heavy duty components, when in a partially deployed position in which the sliding ramp 24 is raised vertically until a nose 25 of the ramp 24 is raised up to the height of the train floor 9. FIG. 11 illustrates the A-March 1, built with heavy duty components, in a fully deployed position, with the nose 25 of sliding ramp 24 sitting on the train floor 9.

Figure 12:
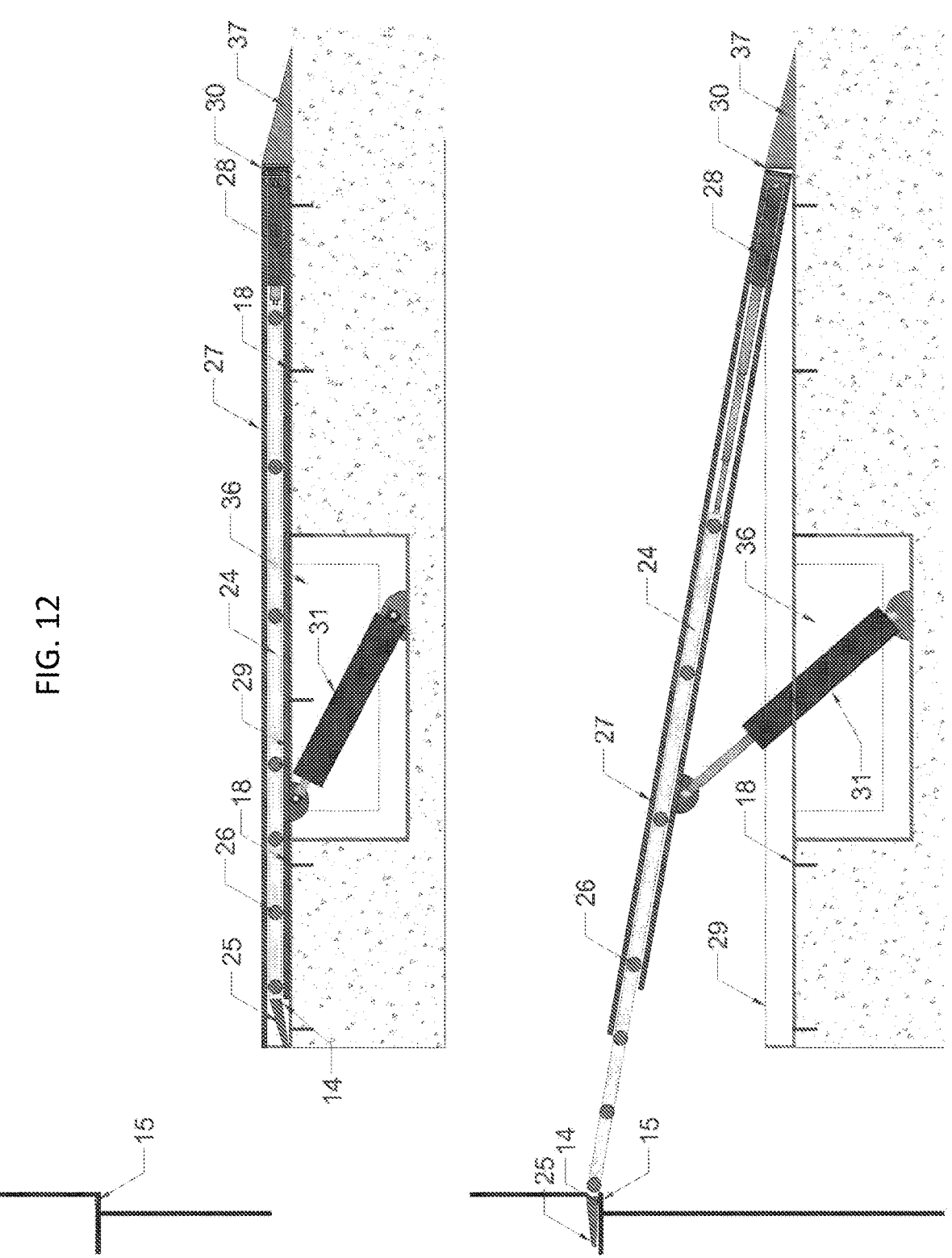
FIG. 12 illustrates detailed side views of the A-MAR built with heavy duty components and showing a heavy duty sliding ramp in a stand-by (top panel) and fully deployed (lower panel) positions.

FIG. 12 illustrates detailed side views of the A-March 1, built with heavy duty components, in both the stand-by position (ramp not in use) and also in the fully deployed position. The heavy duty sliding ramp 24 is more robust, wider and longer than the standard sliding ramp 10, therefore is able to respond to more severe requirements: heavy pedestrian traffic or heavy merchandise to load and unload.

The heavy duty sliding ramp 24 is pushed up and pulled down inside the heavy duty casing box 27 by one or more heavy duty ramp actuator(s) 28.

As illustrated in each of FIGS. 9-14, the heavy duty casing actuator(s) 31 are installed in a recess 36 on the platform 2. This allows the casing box 27 to be maintained close to the surface of the platform 2 to reduce the required size of entry ramp 37.

The ramp sensor(s) 14, installed on the ramp's nose 25 are designed to communicate with the train sensor(s) 15, installed on the train floor 9 in a similar manner to that described above. The sensor signals are fed to a central control unit, which controls actuators 28 to correctly deploy the A-March 1.

The heavy duty casing box 27, the heavy duty supporting frame 29, the heavy duty hinge 30 and the heavy duty casing actuators 31 are also more robust than the similar components used for the regular A-MAR.

Figure 13:
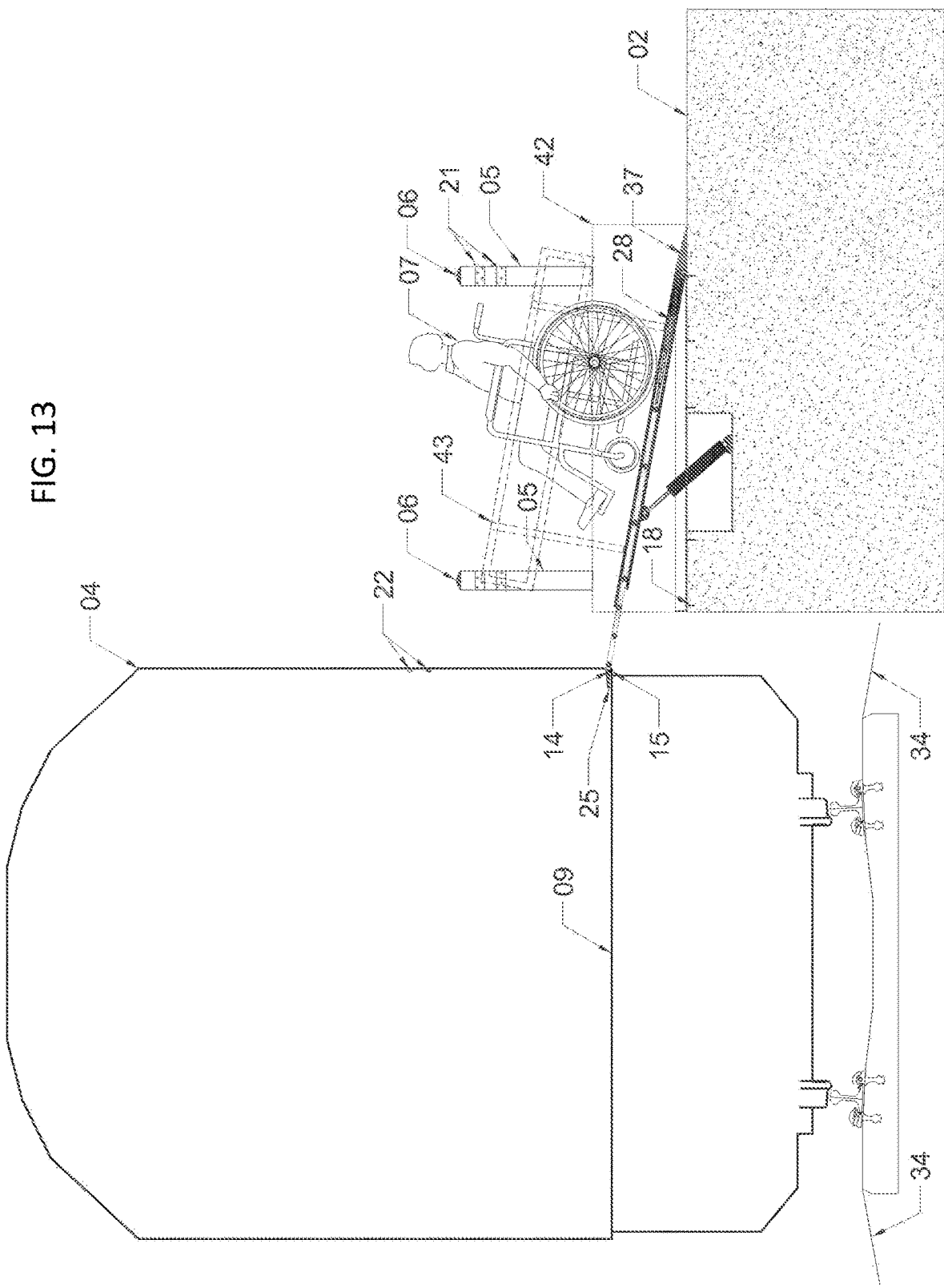
FIG. 13 is a side view of a train platform and a train illustrating a disabled person on a wheelchair embarking the train using an A-MAR built with heavy duty components.
Figure 14:
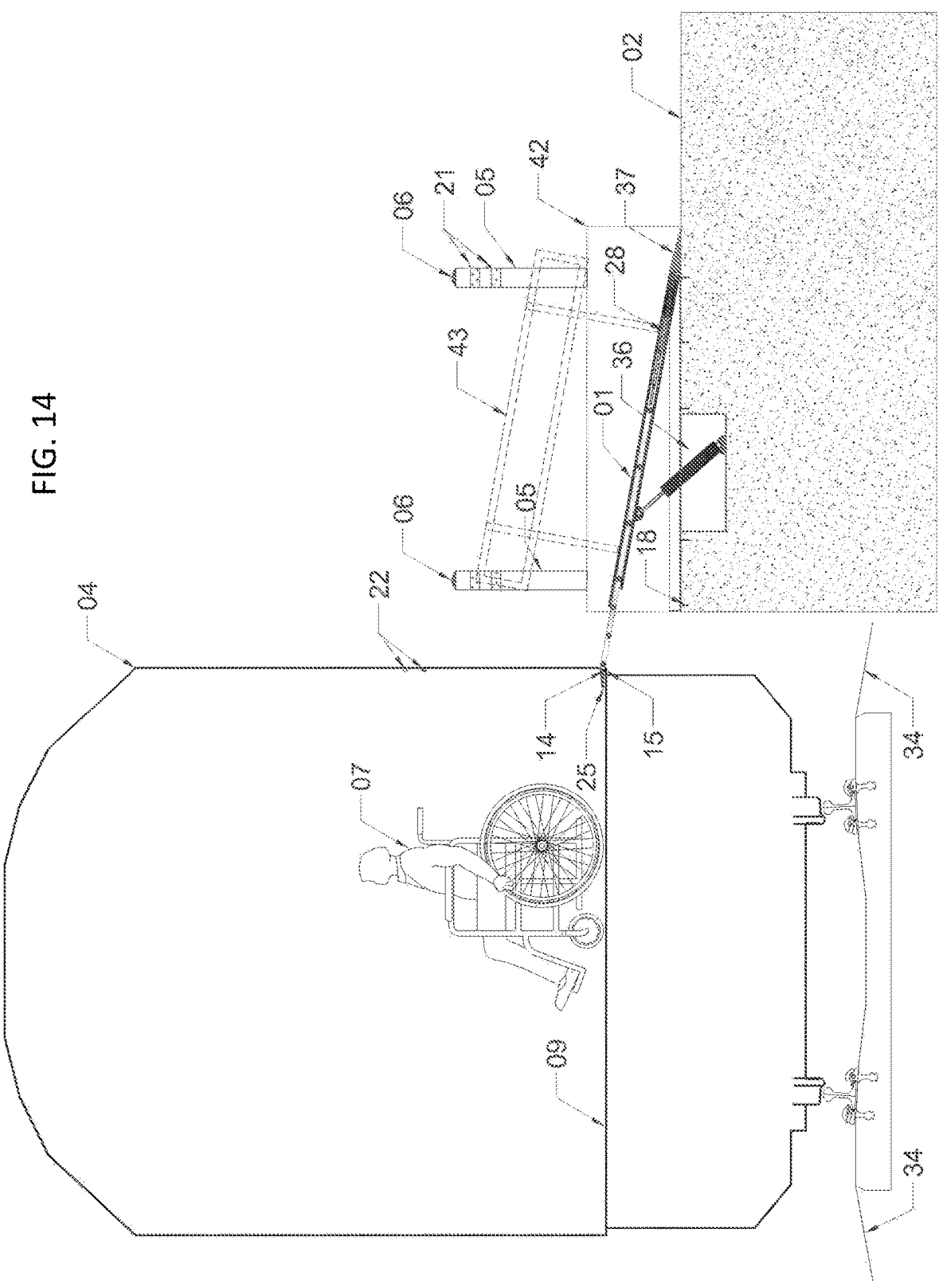
FIG. 14 is a side view of a train platform and train illustrating a disabled person on the train floor after using the A-MAR that is built with heavy duty components.
Figure 15:
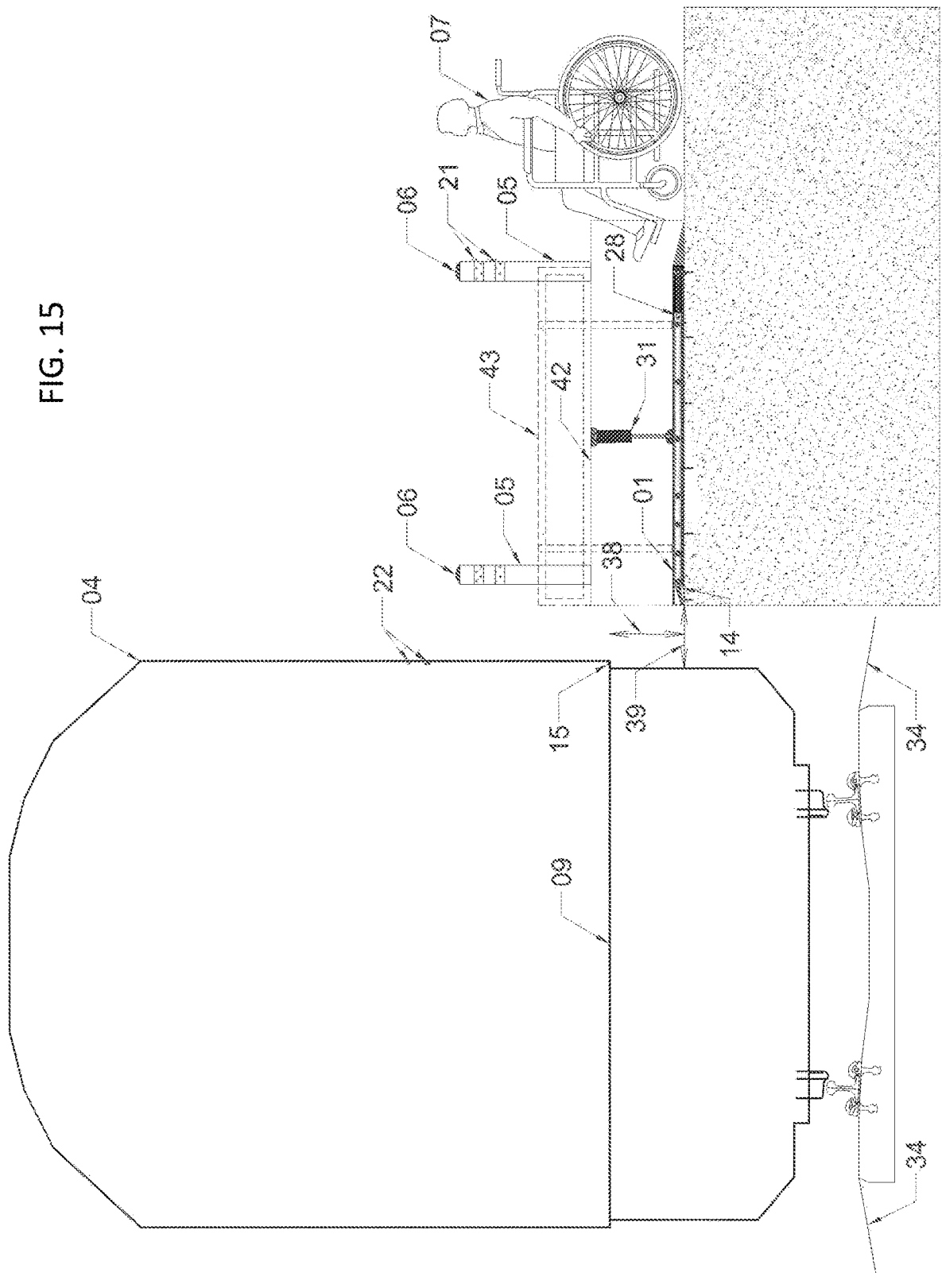
FIG. 15 is a side view of a train platform and train illustrating a further embodiment A-MAR in which include actuators disposed within protection walls, the A-MAR is shown in a stand-by position.
Figure 16:
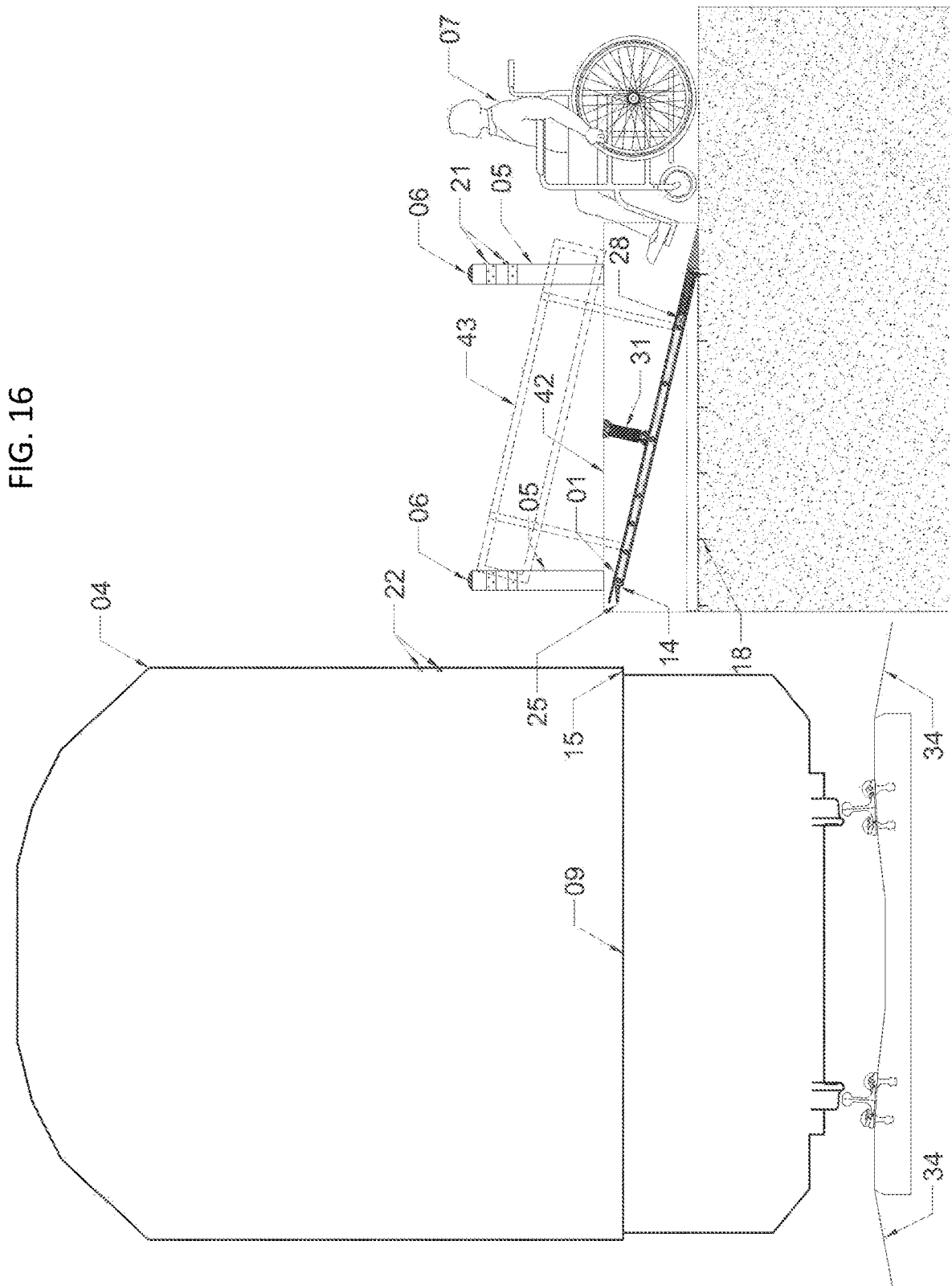
FIG. 16 is a side view of the A-MAR of FIG. 15, showing the A-MAR in a partially deployed position.
Figure 17:
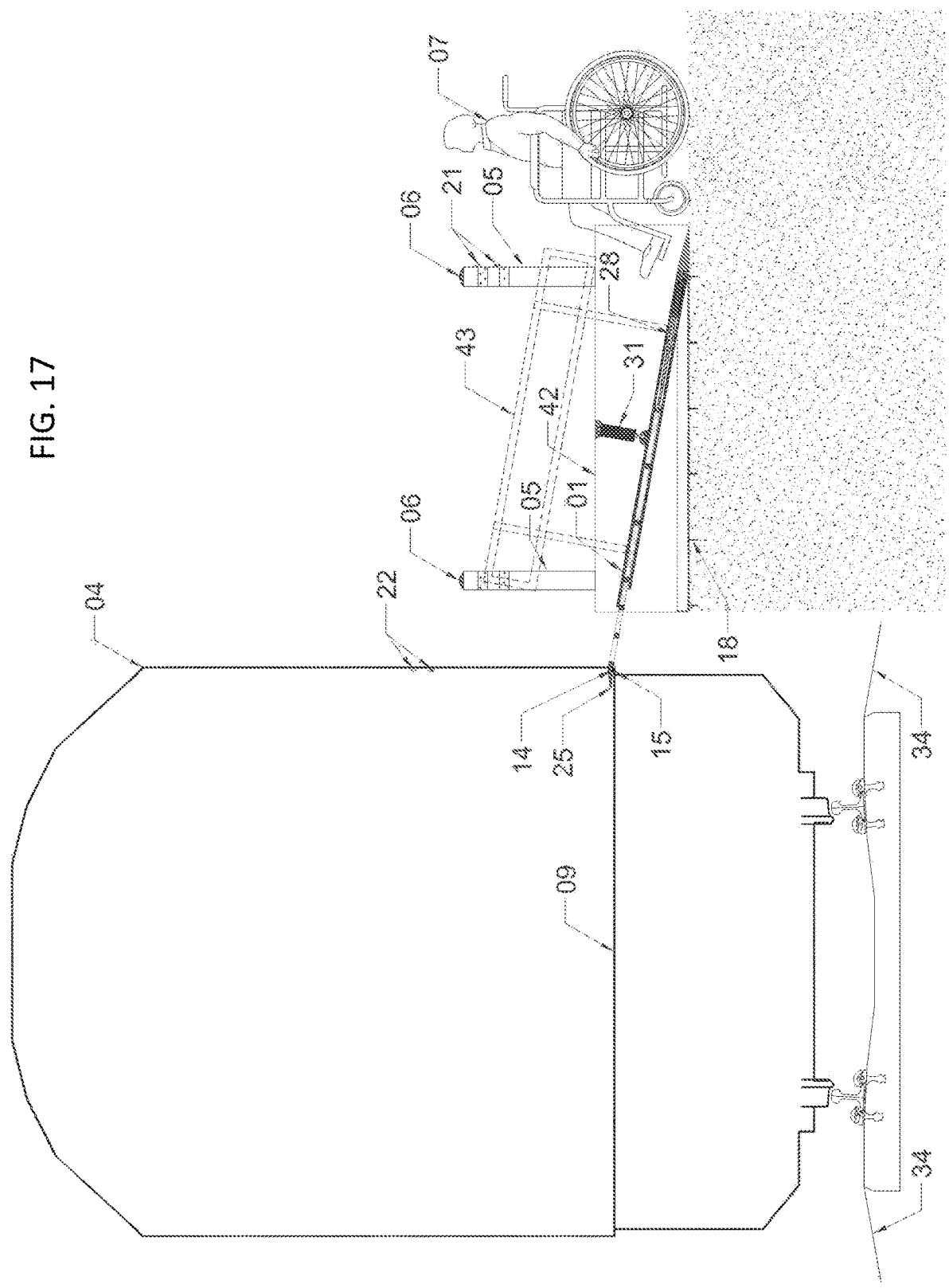
FIG. 17 is a side view of the A-MAR of FIGS. 15 and 16, showing the A-MAR in a fully deployed position with the sliding ramp engaged with a train floor.

FIG. 13 illustrates the A-March 1, built with heavy duty components, in use by a disabled person on wheelchair 7 to access the train floor 9. FIG. 14 illustrates the disabled person on wheelchair 7 standing on the train floor 9, after using the heavy duty A-March 1.

In alternative embodiments of the A-March 1 (not illustrated), built with heavy duty components, is to install the casing box actuators 20 inside the protection walls 42. This option is illustrated in drawings 15 to 17.

A-MAR Overview of Operation

The Ascending Mechanised Access Ramps (A-MAR) 1 are installed on the Platforms 22 of the train stations at the locations where boarding assistance areas 3 are provided for disabled persons on wheelchairs 7 to access the trains.

The A-March 1 is surrounded and protected by at least four safety bollards 5, installed on two protection walls 42, installed on each side of the ramp.

The safety bollards 5 are also used to localise the boarding assistance areas 3 and the Ascending Mechanised Access Ramps (A-MAR) 1.

Tactile 32 and standard indicators can be also installed on the train station to localise and facilitate the access to the boarding assistance area 3 and the A-March 1.

These wayfinding facilities will be customised in each train station, in conjunction with stakeholders' requirements.

In order to use the A-March 1, the disabled persons on wheelchairs 7 will press the warning button 21 situated on at least one of the bollards 5. The flashing lights 6 will be instantly activated.

The train driver's attention will be captured by the flashing lights 6 and will pay more attention to stop the train exactly at the car stop mark, to make sure the A-March 1 is aligned with the train door.

Once the train doors open, the operating system of the A-March 1 is automatically activated. The sliding ramp 10 is then fully deployed, as controlled by the central control unit, with support of ramp sensors 14 and train sensors 15. The full deployment of the sliding ramp 10 takes approximately 5 seconds.

When the commuters' boarding is completed, the return to the stand-by position of the sliding ramp 10 can be activated by:

any person on the platform, by pressing the warning buttons 21 on the safety bollards 5f; or.

any person in the train, by pressing the train warning buttons 22; or the train guard, by pressing a warning button in his cabin; or the train driver, by pressing a warning button in his cabin.

The operating system is similar for disembarking from the train to the platform: the disabled person on wheelchair 7 presses a train warning button 22 located on the train, which activates the flashing lights 6 on the bollards 5 and signalise the train driver his/her intention to disembark. In some embodiments, activation of the train warning button 22 directly alerts the driver by way of a warning light on a train indicator panel.

The return of the sliding ramp 10 to the "stand-by" position will typically take approximately 5 seconds.

As soon as the train door is open, the operating system of the A-March 1 is activated.

A combined wired and wireless system will facilitate the communication between the central control unit with all warning buttons and all sensors.

A microcontroller control system is employed to perform sequenced actions and make decisions based on pre-programmed scenarios. This microcontroller setup, with small variations, may be employed on both the platform and vehicle-based systems.

On the platform-based system, inputs to the platform-based microcontroller system will be in the form of low-level digital inputs, low-level analog inputs and high-level communications interfaces.

Input to this system will be:

User push buttons 21

Sliding ramp sensor 14

Feedback from heavy duty actuator for casing box 31

Feedback from actuator for sliding ramp 13

Outputs from the microcontroller will be in the form of digital outputs which control the following:

Flashing lights 6

Lifting and pulling down of casing box 12, via actuator 20

Extension and retraction of sliding ramp 10, via actuator 13

Figure 18:
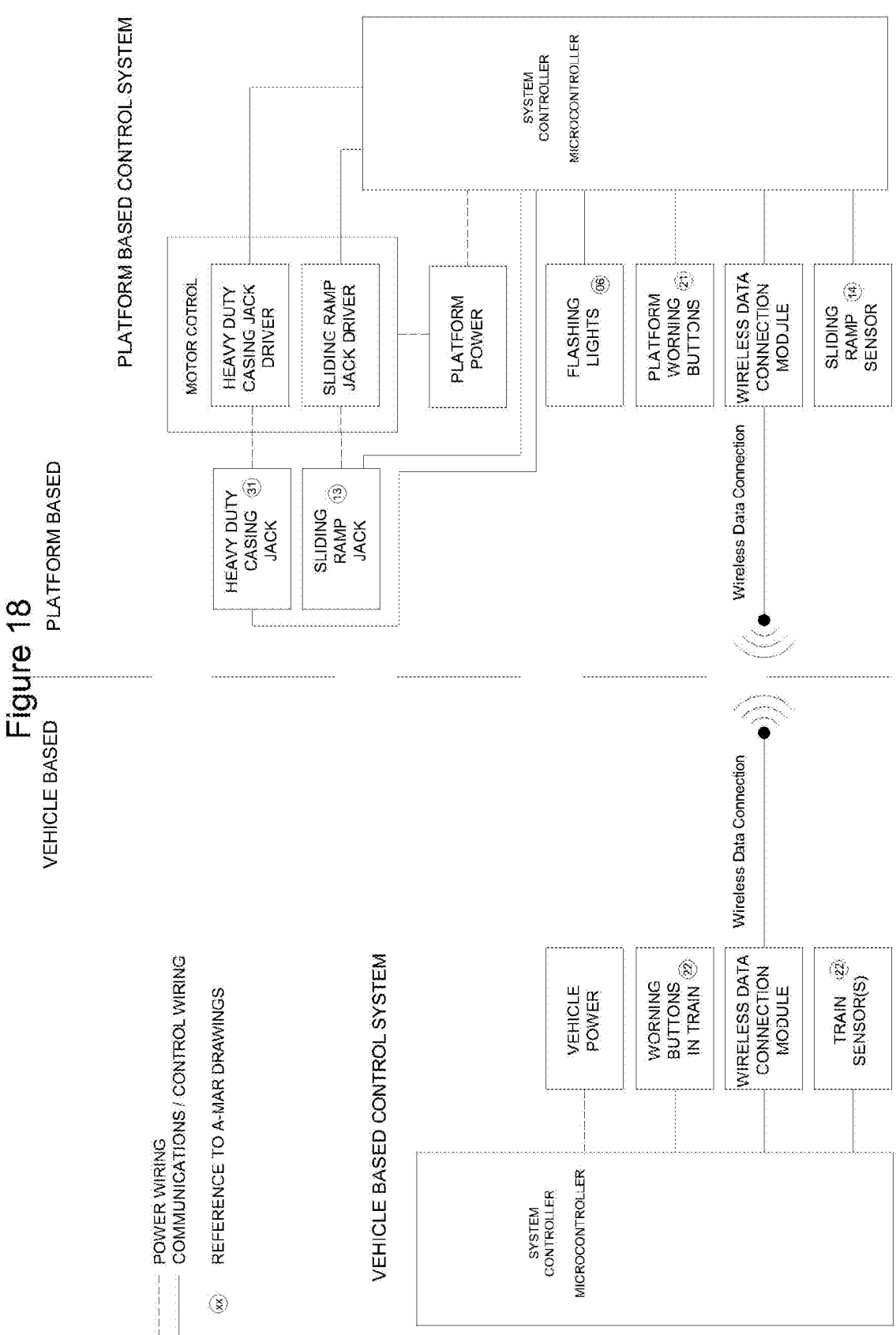
FIG. 18 is a system diagram schematically illustrating wireless communication between a system controller on-board a train and a system controller installed on a platform or the A-MAR itself.

Referring to FIG. 18, there is illustrated a system level diagram illustrating the electrical or wireless communication between system controllers and components. On the vehicle-based system, inputs to a vehicle-based microcontroller system will be in the form of low-level digital inputs and high-level communications interfaces. Input to this system will be the user push buttons 22, vehicle-based sensor 15 and sliding ramp sensor 14. The vehicle-based system controller communicates wirelessly with a platform-based system controller via Bluetooth or another wireless communication protocol through respective wireless data connection modules. The platform-based microcontroller may be embedded within the platform 2 or the A-March 1 itself. The platform-based microcontroller is in electrical communication with the various components of A-March 1 such as sliding ramp sensor 14 and mechanical actuators 13, 20, 28 and 31.

When the A-March 1 is in motion at any time, these sensors give feedback to their vehicle and platform-based microcontrollers with information of their relative position to each other and to other objects. This allows the microcontroller to make decisions about the ramps' movement.

Communication between the platform-based system and the vehicle-based systems will be wireless and have a range sufficient that communications is established well before a vehicle arrives at a platform. When in range, these systems will communicate and trigger actions within the others' system. Actions include:

When a passenger needs to alight, this will be communicated from the vehicle-based system to the platform system, before the vehicle arrives at the station.

The relative position of the two sensors: vehicle-based sensor 15 and sliding ramp sensor 14, will be communicated between both vehicle and platform systems to determine further ramp movements.

First Preferred Embodiment

A first preferred embodiment of the A-MAR is illustrated in FIGS. 3 to 7. In this embodiment, the A-March 1 is bolted directly on the train station platform 2.

The main advantage of this first preferred embodiment is the easiness of the installation of the A-March 1, as it requires minimum man hours. A small mounted entry ramp 37 is required to provide wheelchair access from the platform 2 to the upper surface of the casing box 12 of A-March 1. The first preferred embodiment is a low cost option for a regular A-March 1.

Second Preferred Embodiment

There is an option to install the Mechanised Access Ramp (A-MAR) 1 with an embedded supporting frame 16, such that the sliding ramp 10 and the casing box 12 is positioned at the same level with the platform 2. This option is not shown in the figures. However, it removes the need for an entry ramp 37.

A recess in the platform 2 is required in order to embed the entire A-March 1 such that the sliding ramp 10 and casing box 12 at the same level with the platform 2.

The main advantage of this embodiment is the easy access of wheelchairs to the A-March 1, as the small mounted ramp 37 is not required.

However, the mechanised access ramp installation for this embodiment requires more man hours, therefore is also more expensive. More platform remediation works are also required if the A-March 1 is replaced with an upgraded version, which has different dimensions than the precedent version.

Third Preferred Embodiment

FIGS. 9 to 14 illustrate side views of an A-March 1 built with heavy duty components. This design is suitable to be used for heavy pedestrian traffic, which requires wider and more robust ramps.

The A-March 1, built with heavy duty equipment, is also used to cover higher and/or wider gaps between the platform and the train.

The A-March 1, built with heavy duty equipment, can also be used for loading and unloading general heavy merchandise.

The A-March 1, built with heavy duty components, is more robust and has a much longer operating life.

Fourth Preferred Embodiment

In any of the first, second and third preferred embodiments, the A-March 1, can be built with the casing box actuators 20 installed in the safety walls 42. The main advantage of this preferred embodiment (shown in drawings 15 to 17) is improved access to these actuators and implicitly an easier maintenance.

Fifth Preferred Embodiment

With reference to FIG. 8, applicable to all Embodiments, there are illustrated two options for the sliding ramp 10: a flat sliding ramp 10 and a sliding ramp 10 with safety edges 23, for safer access to the train floor, especially for very large horizontal gaps 39 between the train and the platform.

Sixth Preferred Embodiment

With reference to first, fourth and fifth embodiments, a sixth preferred embodiment, also called Mobile Ascending Mechanised Access Ramp (Mobile A-MAR), has the additional feature of being on wheels and can be manually positioned exactly in front of the train door.

The sixth preferred embodiment, the Mobile Ascending Mechanised Access Ramp (Mobile A-MAR), is recommended to be used on small train stations, with a limited number of disable persons on wheelchair requiring assistance to embark to the train.

Seventh Preferred Embodiment

Any of the first to fifth preferred embodiments can be modified to include the additional feature of automatic sideways movement of the A-MAR to enable the precise positioning in front of the train door, in the event the train driver does not stop the train exactly at the designated car stop. This sideways movement may be effected by one or more linear actuators configured to slide the A-March 1 along the platform 2. In some embodiments, these actuators include a screw actuator or rack and pinion actuator. The sideways movement may be facilitated by support wheels mounted on the A-March 1 and configured to roll across the surface of platform 2.

Additional Features and Embodiments

The surface of the sliding ramp 10 and the surface of the casing box 12 may be covered with a non-slippery coating such as rubber to increase friction and reduce slipping of passengers.

The A-MAR may be built using standard materials and equipment, as well as approved composite and electrical non-conductive components, in accordance with rail industry, safety standards and requirements.

All mechanical actuators 13, 20, 28 and 31 may be standard "off the shelf" components, such as electrical actuators, pneumatic actuators (e.g. jacks), compressed air cylinders, hydraulic actuators, gas actuators, telescopic screw actuators, ball screw actuators or rack and pinion steering system. However, it will be appreciated that additional customised components may be used in place of standard commercially available components.

The A-MAR can be custom designed to satisfy the general standard obligations and the stakeholders' requirements, to fulfil the function of the ramp, to satisfy any train access requirement or loading capacity.

The A-MAR can be used by disabled persons on wheelchairs, in order to have an independent access to public transport, public buildings, shopping centres, private properties and any other edifices.

The A-MAR can be used by aged population, persons with reduced mobility, persons with prams and heavy luggage, as well as by general public.

The A-MAR can also be used for loading and unloading the general merchandise to and from cars, trucks, trains or buildings.

The A-MAR is advantageous for reduced installation time and cost.

The A-MAR can be easily relocated, replaced or simply removed, with minimum remediation works.

Interpretation

The terms "controller" "central control unit", "microcontroller", "processor" or the like may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms, "including", "having", "comprising", "comprised of" or "which comprises" are open terms that mean including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Embodiments described herein are intended to cover any adaptations or variations of the present disclosure. Although the present disclosure has been described and explained in terms of particular exemplary embodiments, one skilled in the art will realize that additional embodiments can be readily envisioned that are within the scope of the present disclosure.

Component List
1. A-March
2. Platform of the Train Station
3. Boarding Assistance Area
4. Passengers Train
5. Safety Bollards
6. Flashing Lights on Safety Bollards
7. Disabled Person on Wheelchair
8. Nose of the Sliding Ramp
9. Train Floor
10. Sliding Ramp
11. Side Wheels of the Sliding Ramp
12. Casing Box
13. Actuator for Sliding Ramp
14. Sensor on Sliding Ramp
15. Sensor on Train Floor
16. Supporting Frame for A-March
17. Hinge
18. Holding Bolt
19. Side Wheels Pin
20. Actuator for Casing Box
21. Warning Button on Bollards
22. Warning Buttons in the Train
23. Safety Edge of the Sliding Ramp
24. Heavy Duty Sliding Ramp
25. Nose of the Heavy Duty Sliding Ramp
26. Side Wheel of the Heavy Duty Sliding Ramp 27. Heavy Duty Casing Box
28. Heavy Duty Actuator for Sliding Ramp
29. Heavy Duty Supporting Frame
30. Heavy Duty Hinge
31. Heavy Duty Actuator for Casing Box
32. Tactile on Platform
33. Yellow Line on Platform
34. Track Ballast
35. Edge of Platform
36. Recess in the Platform
37. Small Mounted Ramp
38. Vertical Gap between Platform and Train
39. Horizontal Gap between Platform and Train
40. Assembling Screws for Casing Box
41. Articulation Wheel of the Actuator for Casing Box
42. Protection Wall
43. Handrail

The invention claimed is:

1. An ascending mechanised access ramp system adapted for providing independent access between a station platform and a floor of a train, the system including:

a supporting frame mountable to the platform;

a casing box hingedly mounted to the supporting frame;

a substantially planar sliding ramp, installed inside the casing box;

side wheels installed on the sides of the sliding ramp, to allow the sliding ramp to skate inside the casing box;

a remote controlled deployment mechanism configured to automatically move the sliding ramp between a stand-by position and a fully deployed position, so that a nose of the sliding ramp is raised to a height equal with the floor of the train and is adapted for engagement with the train;

one or more sensors adapted for installation on the floor of the train and one or more sensors installed on the nose of the sliding ramp to control the deployment of the sliding ramp; and wherein, in the deployed position, the sliding ramp extends across both a vertical gap and a horizontal gap between a station platform and the floor of the train.

2. The system according to claim 1, further comprising a protection wall disposed on each side of the ascending mechanised access ramp.

3. The system according to claim 2, wherein each protection wall includes at least two safety bollards.

4. The system according to claim 3, further comprising a one or more activation buttons configured to trigger activation of the ascending mechanised access ramp by a user.

5. The system according to claim 2, further comprising a handrail attached on each protection wall.

6. The system according to claim 1, wherein the casing box is bascule type and is moveable by one or more casing box actuators.

7. The system according to claim 1, wherein the sliding ramp has a surface that is made of electrical non-conductive material.

8. The system according to claim 1, wherein the deployment mechanism includes an actuator for enabling the sliding ramp to slide inside the casing box.

9. The system according to claim 1, wherein the deployment mechanism includes a telescopic actuator for enabling the sliding ramp to slide inside the casing box.

10. The system according to claim 1, wherein the deployment mechanism includes a ball screw for enabling the sliding ramp to slide inside the casing box.

11. The system according to claim 1, wherein the deployment mechanism includes a rack and pinion steering for enabling the sliding ramp to slide inside the casing box.

12. The system according to claim 1, wherein the supporting frame is on wheels and can be manually moved along the platform and positioned in front of a train door.

13. The system according to claim 12, wherein the supporting frame can automatically move along the platform to enable the precise positioning of the system in front of a train door.

14. The system according to claim 1, wherein the deployment mechanism includes a casing box actuator to rotatably angle the casing box such that the nose of the sliding ramp is equal to or higher than the floor of the train.

15. The system according to claim 1, wherein the deployment mechanism is configured to move the sliding ramp between the stand-by position and the fully deployed position in two stages.

16. The system according to claim 15, wherein the deployment mechanism rotatably angles the casing box to an elevated angle in a first stage of deployment.

17. The system according to claim 16, wherein the deployment mechanism slidingly moves the sliding ramp within the casing box to bring the nose of the sliding ramp into contact with the train floor, in a second stage of deployment.

18. The system according to claim 2, wherein the protection walls include upwardly inclined safety edges.

* * * * *